United States Patent [19]
Pharo

[11] Patent Number: 5,272,856
[45] Date of Patent: Dec. 28, 1993

[54] PACKAGING DEVICE THAT IS FLEXIBLE, INFLATABLE AND REUSABLE AND SHIPPING METHOD USING THE DEVICE

[75] Inventor: Daniel A. Pharo, Valencia, Calif.

[73] Assignee: Air Packaging Technologies, Inc., Valencia, Calif.

[21] Appl. No.: 922,618

[22] Filed: Jul. 30, 1992

[51] Int. Cl.$^5$ ............................................. B65B 23/00
[52] U.S. Cl. ........................................ 53/472; 53/434; 53/512; 53/403; 53/449
[58] Field of Search ................. 53/472, 449, 434, 432, 53/403, 512, 510, 527, 526

[56] References Cited

U.S. PATENT DOCUMENTS

| | | | |
|---|---|---|---|
| 4,793,123 | 12/1988 | Pharo | 53/472 X |
| 4,918,904 | 4/1990 | Pharo | 53/472 |
| 4,949,530 | 8/1990 | Pharo | 53/472 X |
| 4,969,312 | 11/1990 | Pivert et al. | 53/472 |
| 5,131,212 | 7/1992 | Gray et al. | 53/472 |

Primary Examiner—James F. Coan
Attorney, Agent, or Firm—Donald S. Dowden; William E. Pelton

[57] ABSTRACT

A flexible, inflatable packaging device is adapted to enclose and protect an article during shipping and the like. The packaging device has an inlet valve for selectively admitting air to inflate the packaging device to protect an enclosed article against rough handling during shipping and the like and an aperture that can be selectively sealed to retain the inflation air or unsealed to release the inflation air to deflate the packaging device to enable removal of the article from the packaging device and compact storage of the packaging device before and after shipping. The packaging device can be inflated and deflate a plurality of times, thereby enabling reuse of the packaging device for shipping a plurality of articles in succession.

11 Claims, 18 Drawing Sheets

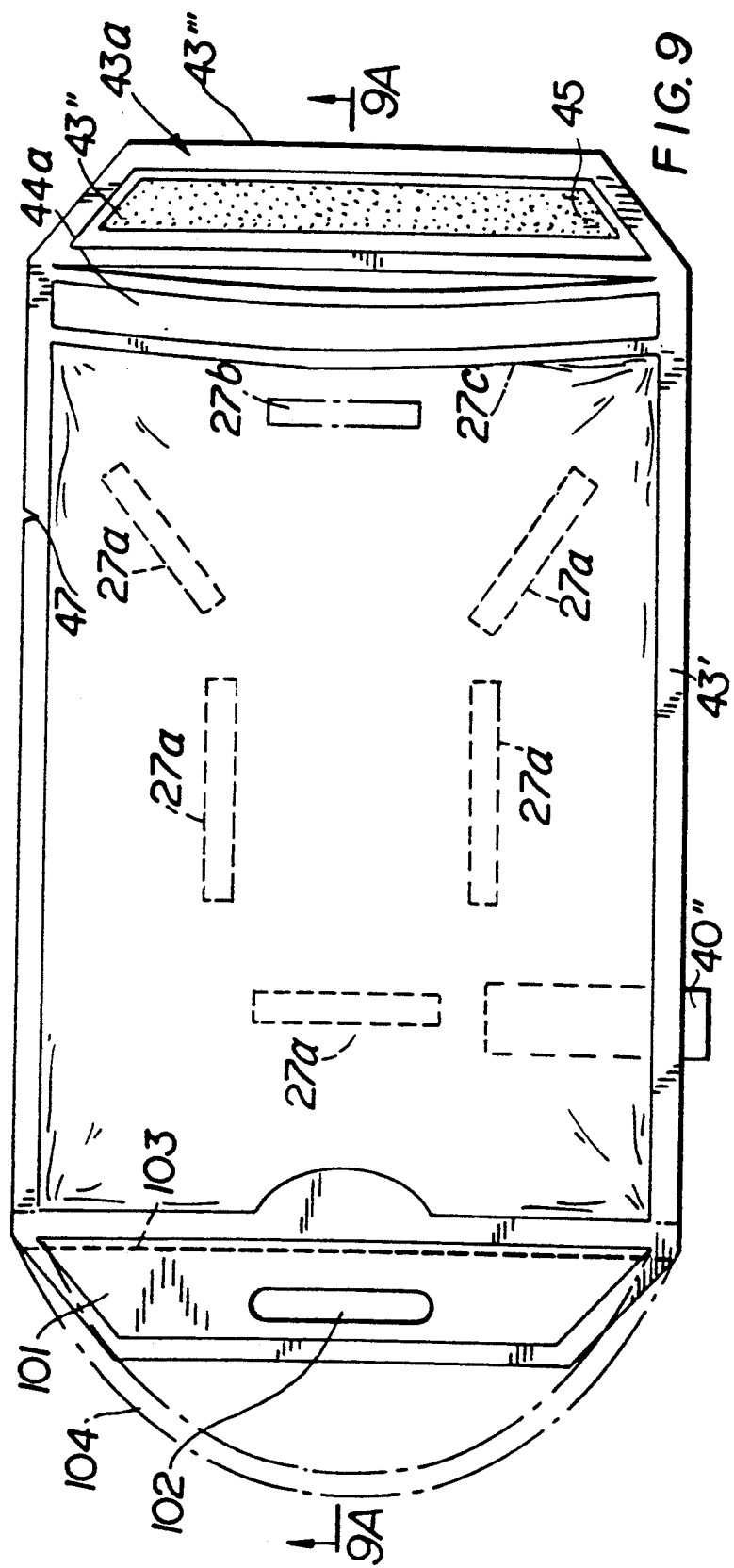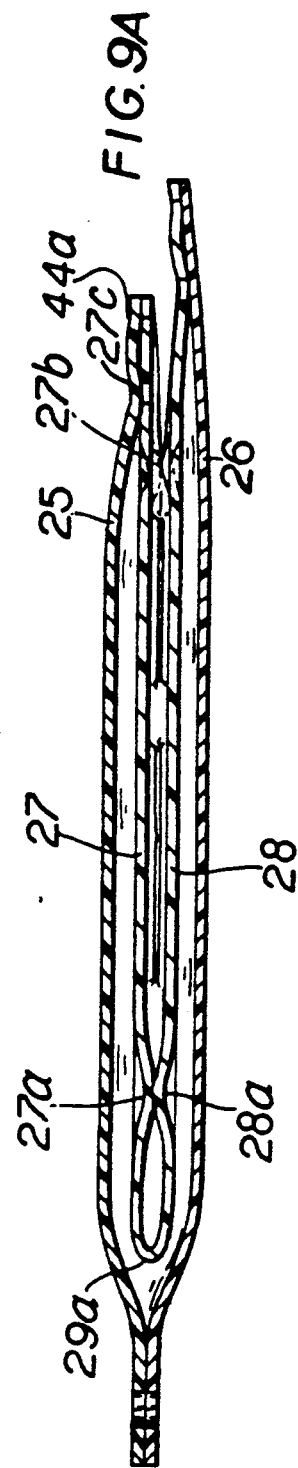

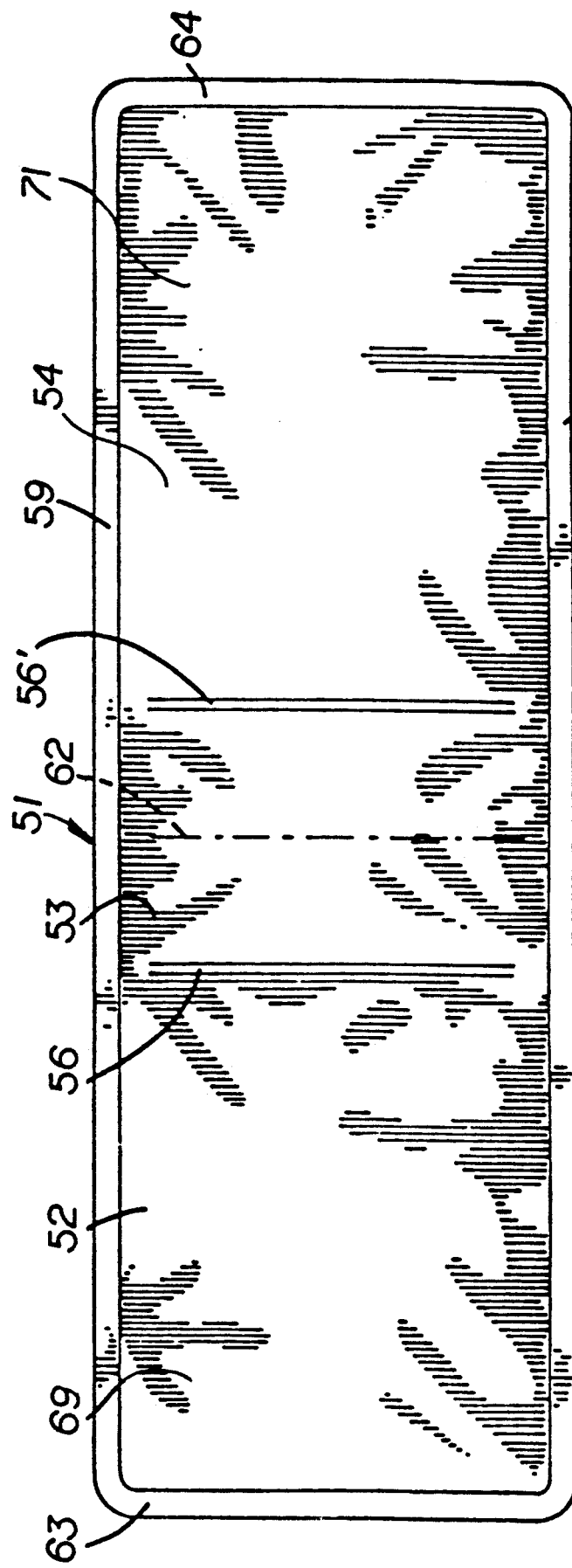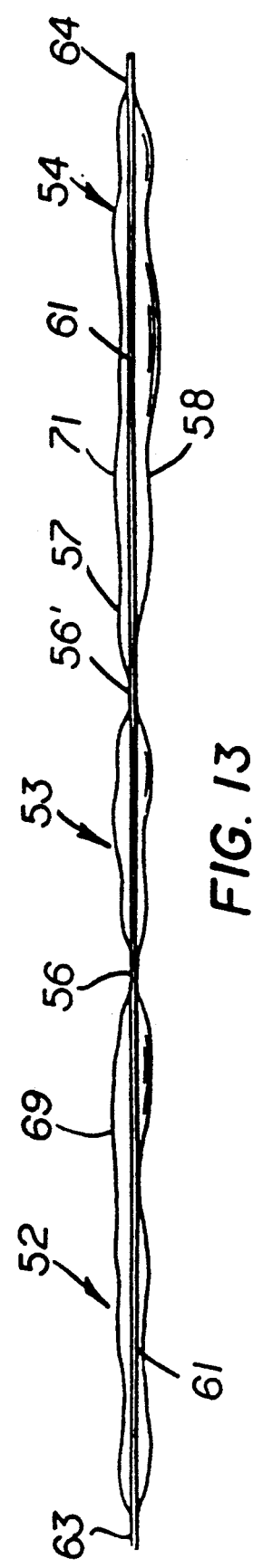
FIG. 12
FIG. 13

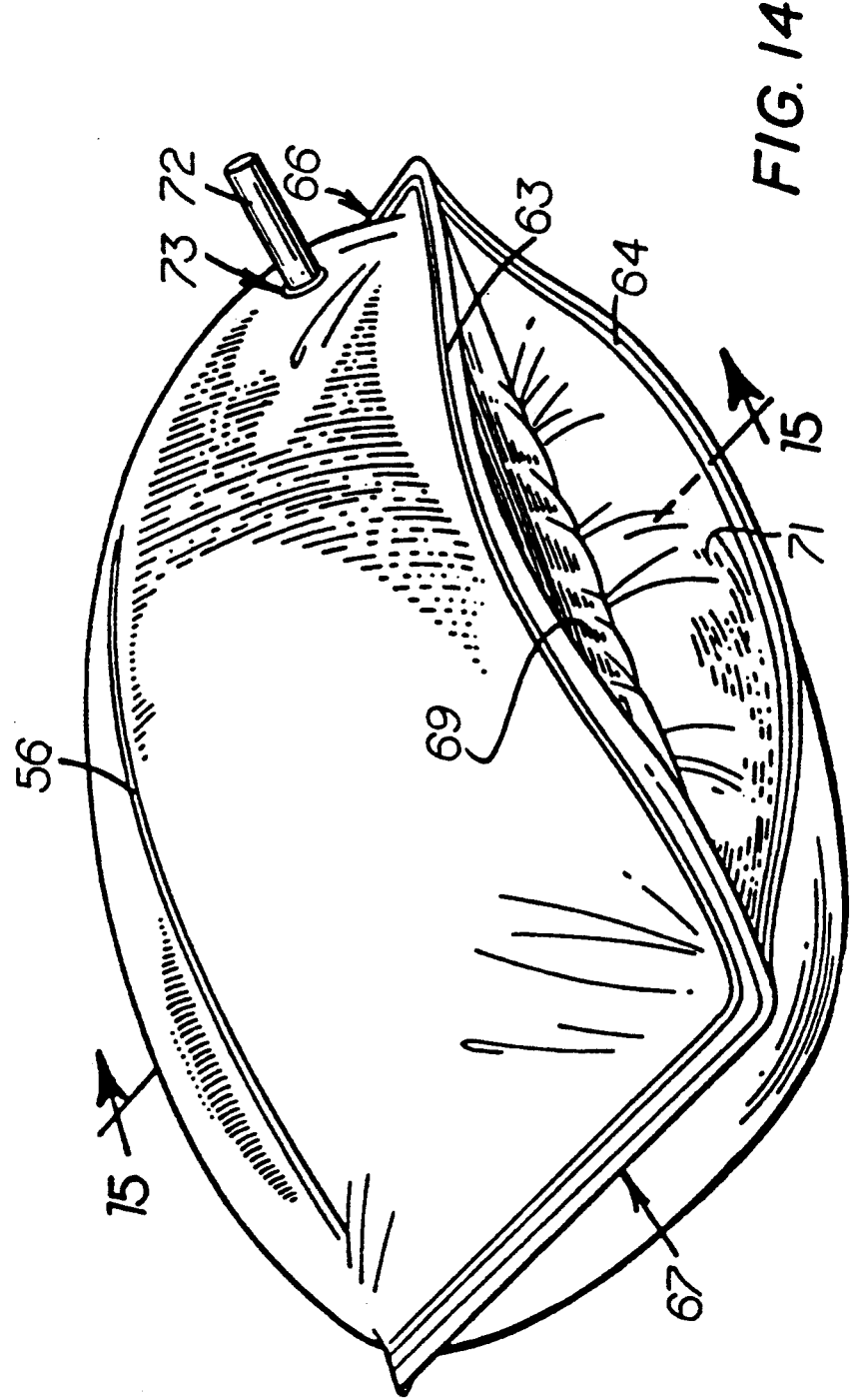

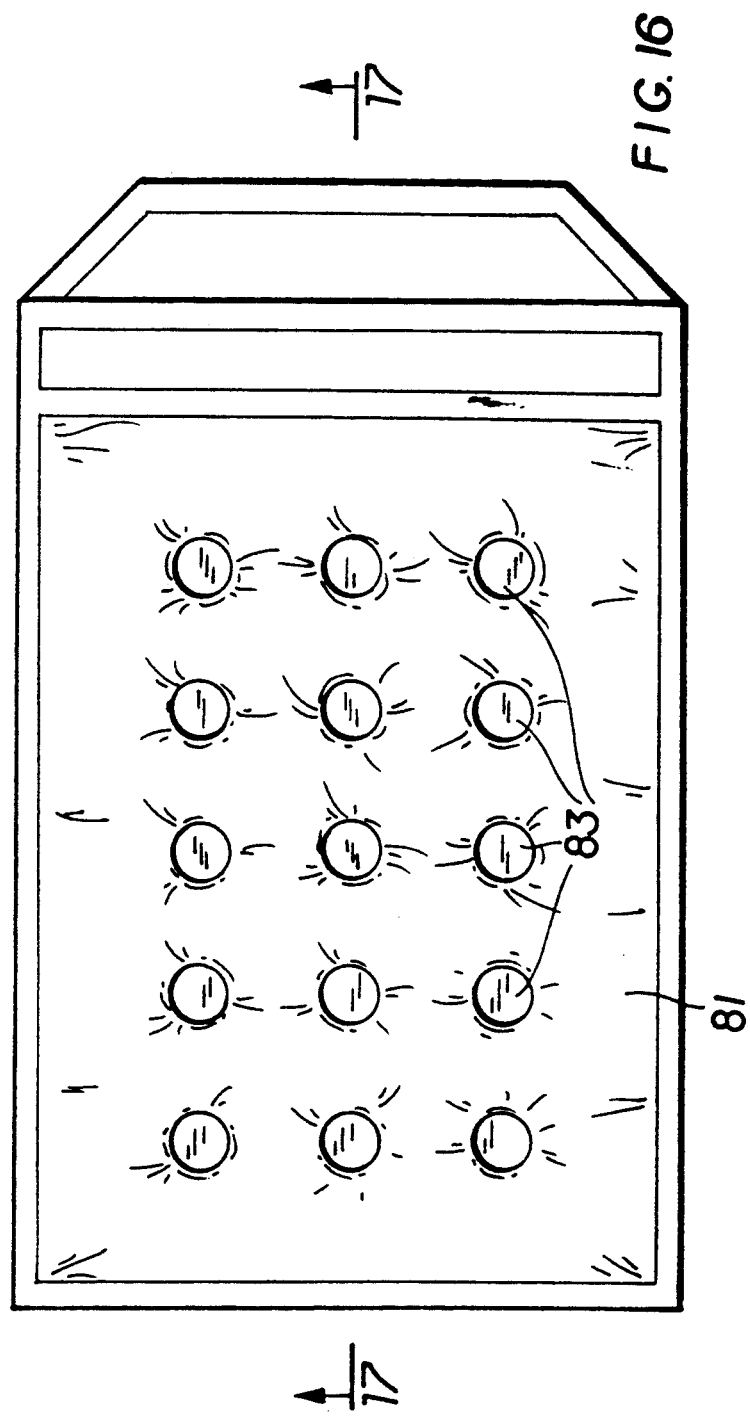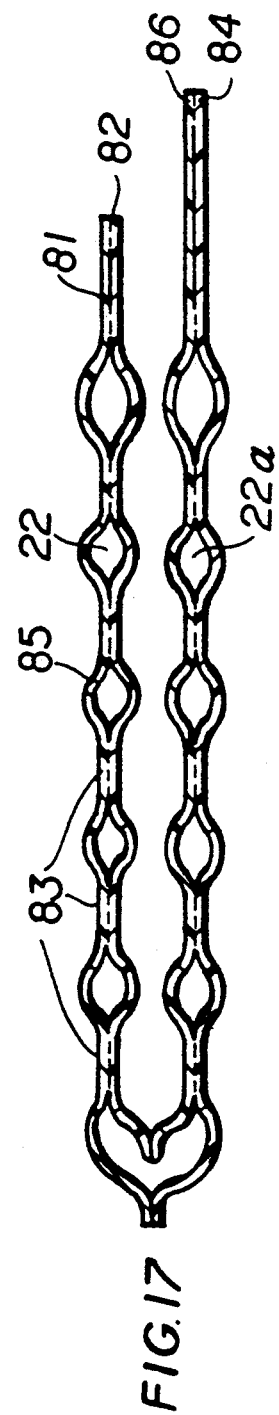

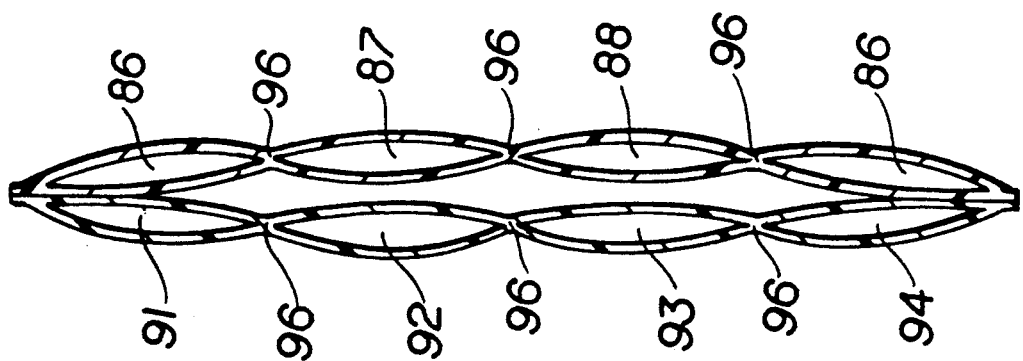
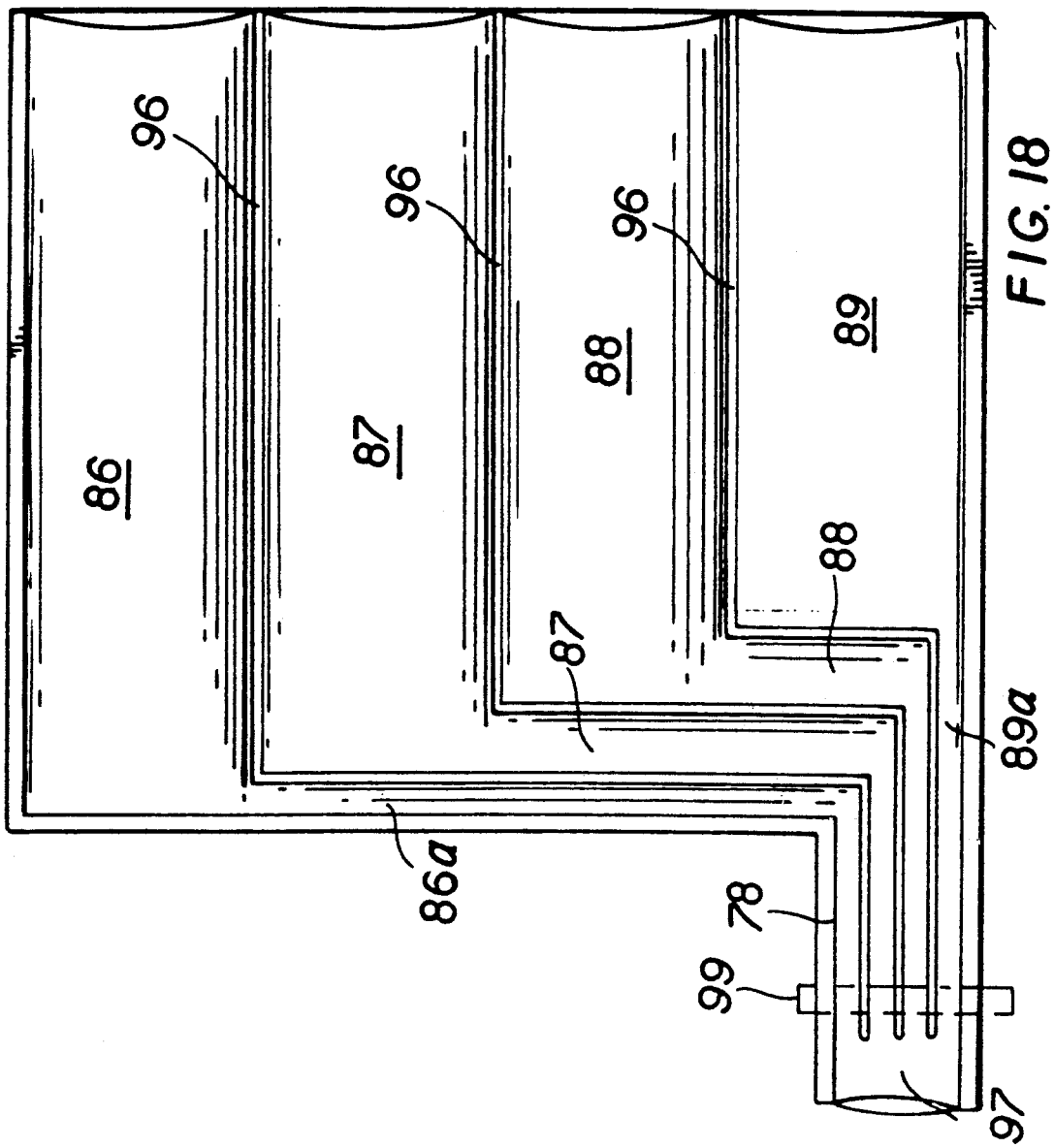

PACKAGING DEVICE THAT IS FLEXIBLE, INFLATABLE AND REUSABLE AND SHIPPING METHOD USING THE DEVICE

BACKGROUND OF THE INVENTION

1. Field of the Invention

This invention relates to packaging devices and, more particularly, to a highly effective, flexible, inflatable packaging device that is adapted to enclose and protect and article during shipment and the like and that has a novel structure that makes it reusable.

2. Description of the Prior Art

Packaging devices, including inflatable packaging devices, have long been known. Inflatable packaging devices have substantial advantages as compared to other packaging systems. In particular, inflatable packaging devices have relatively low weight, especially when the inflation medium is air or a selected gas, thereby often saving considerable sums in shipping charges.

However, conventional inflatable packaging devices have the serious drawback that they are not well adapted for reuse. That is, an inflatable shipping packaging device is typically inflated in a permanent way at the factory, employed to protect an article during shipping and the like, and discarded after the article has reached its destination and been removed from the packaging device. Most such inflatable packaging devices cannot be inflated by users but must be purchased already inflated. It can therefore be expensive to ship a conventional packaging device to a user, even when the packaging device is not employed to enclose and protect an article but is simply boxed and shipped to the user so that the user will have it on hand when shipments are made by the user.

The present applicant has invented a number of packaging devices that need not be inflated by the manufacturer but can be inflated by the user or shipper at the time an article is prepared for shipment. Such user-inflatable packaging devices are inflated by inserting a straw or similar tube through a sort of check valve and blowing air or another inflation medium between plies forming the packaging device to inflate the packaging device at the time of use.

However, even these more modern packaging systems are normally discarded by the recipient of shipped goods and are not reused. Typically, in order to remove a shipped article, it is necessary to deflate the packaging device and this usually involves significant damage to the packaging device, so that it is no longer suitable for further use.

OBJECTS AND SUMMARY OF THE INVENTION

An object of the invention is to remedy the problems of the prior art outlined above. In particular, an object of the invention is to provide a flexible, inflatable packaging device that is reusable.

Another object of the invention is to provide a flexible, inflatable packaging device that is adapted to enclose and protect an article during shipping and the like, that can be inflated for shipment, that can be deflated after shipment to facilitate removal of the enclosed article, and that is able to withstand repeated inflation and deflation without significant deterioration.

These and other objects of the invention are attained in a flexible, inflatable packaging device that is adapted to enclose and protect an article during shipping and the like, the packaging device comprising: user-controllable means for selectively admitting an inflation medium to inflate the packaging device to protect an enclosed article against rough handling during shipping and the like and releasing the inflation medium to deflate the packaging device to enable removal of the article from the packaging device and compact storage of the packaging device before and after shipping, the user-controllable means being operable a plurality of times, thereby enabling reuse of the packaging device for shipping a plurality of articles in succession.

In accordance with the invention, the user-controllable means preferably comprises an inflation valve in the packaging device for admitting the inflation medium, means defining an aperture in the packaging device for releasing the inflation medium, and means for selectively enabling and disabling flow of the inflation medium through the aperture.

In one embodiment of the invention, the means for selectively enabling and disabling flow of the inflation medium through the aperture comprises tape means and reusable adhesive means, the tape means, the reusable adhesive means, and the means defining the aperture cooperating to enable the tape means to be selectively placed over the aperture to disable flow of the inflation medium through the aperture or removed from the aperture to enable the flow of the inflation medium through the aperture.

In another embodiment of the invention, the means for selectively enabling flow of the inflation medium through the aperture comprises clip means engageable with the means defining the aperture and mechanically squeezing the means defining the aperture to disable the flow of the inflation medium through the aperture, the clip means being selectively removable from the means defining the aperture to enable the flow of the inflation medium through the aperture.

In accordance with an independent aspect of the invention, there is provided a shipping method that takes full advantage of the packaging device of the invention.

BRIEF DESCRIPTION OF THE DRAWING

A better understanding of the objects, features and advantages of the invention an be gained from the following detailed description of the preferred embodiments thereof, in conjunction with the appended figures of the drawing, wherein:

FIG. 9 is a top elevational view of a modification of the packaging system of FIG. 1;

FIG. 9A is a view taken along the line IX—IX of FIG. 9;

FIG. 12 is a top plan view of still another modification, in which a pre-fabricated inflatable element is adapted to be formed into a packaging system;

FIG. 13 is a side elevational view of the package of FIG. 12;

FIG. 14 is a perspective view illustrating a frontal side of the packaging system of FIG. 12;

FIG. 16 is a top plan view of still another modification of the packaging system;

FIG. 17 is a view taken along the line XVII—XVII of FIG. 16;

FIG. 18 is a top plan view of a further modification of the packaging system;

FIG. 19 is a view taken along the lines XIX—XIX of FIG. 18;

DESCRIPTION OF THE PREFERRED EMBODIMENTS

FIGS. 1-20 are taken from applicant's copending application serial No. 07/920,006 filed Jul. 7, 1992 for "Merchandise Encapsulating Packaging System and Method Therefor," which is a continuation of application Ser. No. 07/780,522, filed Oct. 19, 1991, and 07/518,992, filed May 4, 1990, and now abandoned. FIGS. 1-20 are illustrated and described herein in order fully to disclose the environment in which the present invention functions and structures to which the present invention is applicable.

DESCRIPTION OF STRUCTURES IMPROVED BY THE INVENTION

Figure 1:
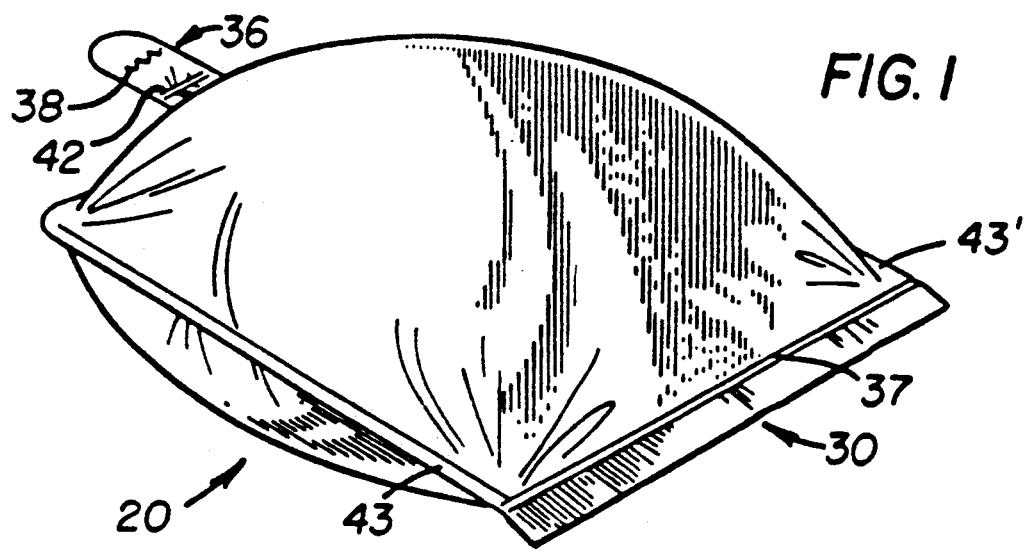
FIG. 1 is a perspective view of a packaging device to which the invention is applicable.
Figure 2:
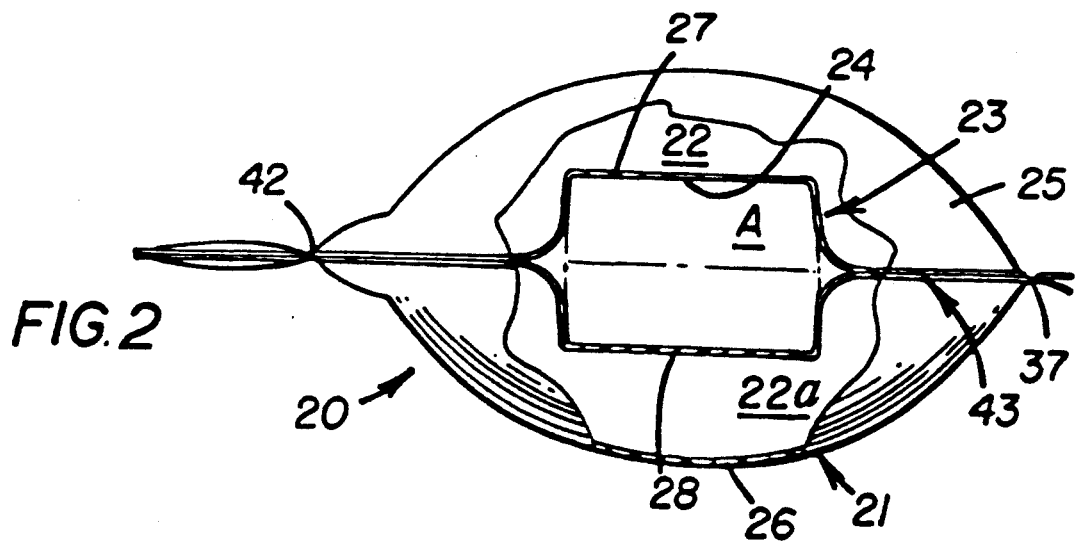
FIG. 2 is a partially sectioned side elevational view of the structure of FIG. 1.

Referring now to the drawings and in particular to FIGS. 1 and 2, there is illustrated a double walled packaging system 20 comprising an outer enclosure 21 defining top and bottom major inflatable chambers 22 and 22a respectively therein. The construction of the package 20 is such that there is defined therein an item-receiving zone or pocket 24 for retaining an article A. The chambers 22 and 22a may be expansion chambers, as shown, where wall panels such as wall panels 25 and 26 are constructed of at least a gas impervious and flexible material as described below. Alternatively, it is within the scope of this invention for the wall panels 25 and 26 to be constructed of rigid lightweight material such as a plastic of the type sometimes used in suitcases which is also gas impervious.

Figure 3:
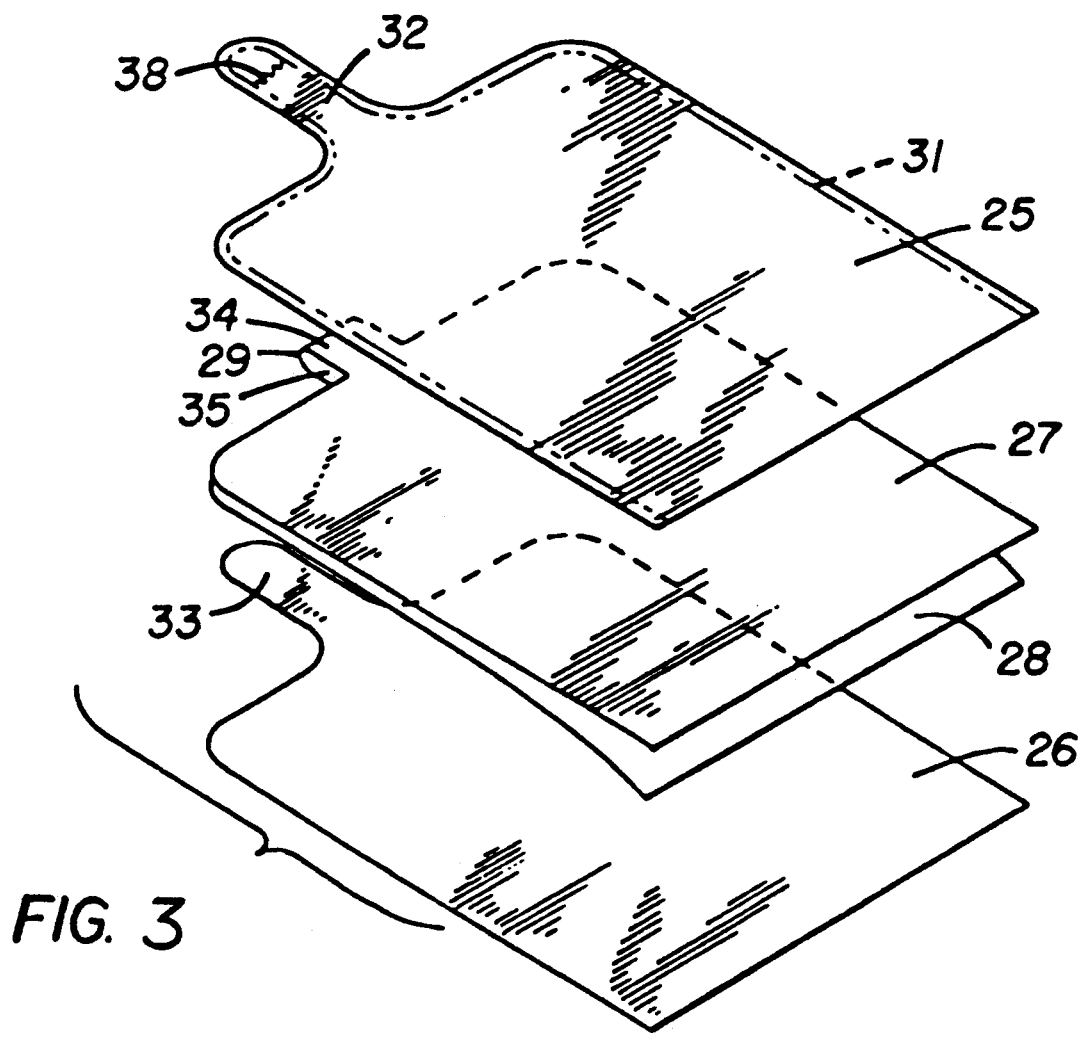
FIG. 3 is an exploded perspective view of cut wall panels utilized to form an inflatable composite package.

With reference to the embodiment of FIGS. 2 and 3, the outer enclosure 21 comprises the pair of superimposed and substantially identical outer wall panels 25 and 26. Similarly, the item-receiving zone 24 is formed from a pair of superimposed and substantially identical inner wall panels 27 and 28 which may be connected together at a fold 29, although the inner wall panels need not be folded as depicted. The inner wall panels 27 and 28 are situated between the outer wall panels 25 and 26. All four panels are connected together along corresponding outer segments thereof, preferably by heat sealing techniques as described below, to form the composite package.

Each of the wall panels 25-28 is preferably composed of a gas-impervious composite laminate, such as the type described in U.S. Pat. No. 4,597,244. For example, each flexible panel may be formed from puncture resistant sheets or laminates of polyethylene or of metallized nylon or a similar material often referred to as "Mylar". The panels may also comprise an intermediate layer of aluminum and inner and outer layers of a plastic heat-sealable coating, such as polyethylene, adapted to reactivate (melt) in the range of 300~ F. Such composite laminates (which may be constructed to be highly flexible and either inextensible or extensible) may be formed from two thin films bonded together with a known adhesive or brought together using hot fluid polyethylene as the bonding agent. For present purposes, it has been found suitable for the inner and outer wall panels to comprise laminates having a composite thickness in the range of from about one (1) to about ten (10) mils. In the embodiment illustrated in FIG. 3, the panels 25-28 are heat-sealed together along selected overlying segments, preferably along the peripheral edges thereof to form a composite package for the packaging system with a closeable open end 30, illustrated in its closed condition in FIG. 1 and in its open condition in FIG. 4.

Referring again to FIG. 3, exemplary common sealing areas for the four wall panels are located along selected peripheral edge portions of the panels, depicted by the broken line 31. The panels may be suitably cut and sealed together by conventional apparatus and methods, such as those described in U.S. Pat. No. 4,545,844. It is a particular advantage of the packaging system of the present invention however that the package itself may be formed from a plurality of continuously running webs of plastic sheeting which are automatically processed into completed packaging such as by superimposing, sealing and cutting at appropriate stages and in appropriate sequence as desired.

In the structure depicted in FIGS. 1-7, and in particular as shown in FIG. 3, the overlying outer wall panels 25 and 26 are provided with integral stem portions 32 and 33 respectively, which extend outwardly from corresponding rear edges. These superimposed stem portions together define one type of filling stem generally indicated by reference numeral 36 in FIGS. 1 and 4-6. In forming the composite package, the peripheral edges of each of the stem portions 32 and 33 are heat-sealed together.

Figure 6:
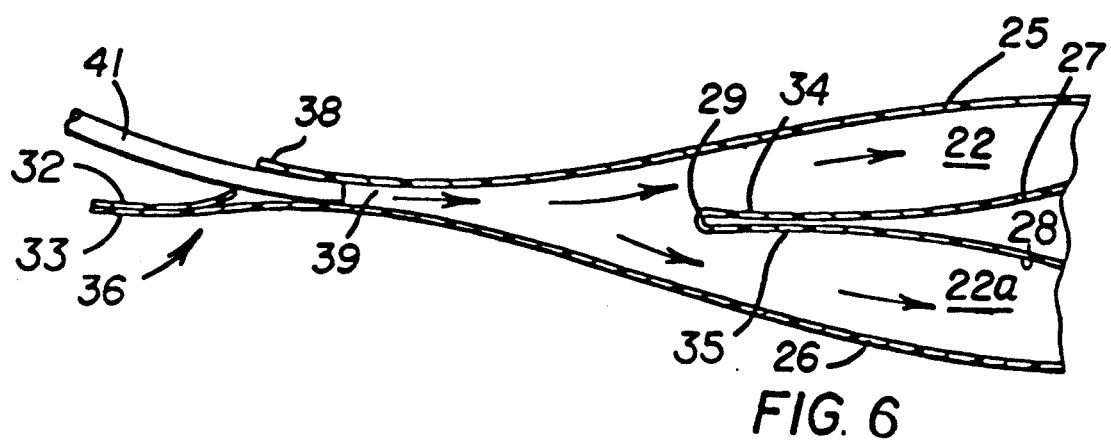
FIG. 6 is an enlarged sectional view, taken along the line VI—VI of FIG. 5.

As shown in FIGS. 3 and 6, the inner wall panels 27 and 28 may similarly be formed with corresponding stem portions 34 and 35 respectively. In completing the composite package, the outer stem portions 32 and 33 are heat-sealed to the underlying parallel side edges of the inner stem portions 34 and 35. As indicated above, the inner stem portions 34 and 35 may be joined together by a fold 29. In that case, the fold itself remains unsealed relative to the overlying stem portions 32 and 33. As shown in FIG. 6, the fold 29 extends only a limited distance into the volume defined within the filling stem 36 by the stem portions 32 and 33. This interior volume of the stem 36 thereby constitutes a plenum at the rear of the package. As described more fully hereinafter, a filler medium such as pressurized air is injected into the plenum portion of the filling stem 36 and from there passes respectively over and beneath the stem portions 34 and 35 joined by the fold 29 and into the top and bottom chambers 22 and 22a respectively on either side of the item-receiving zone.

In the embodiment depicted in FIGS. 9 and 9A, the inner wall panels 27 and 28 are joined together along a fold line 29a which extends entirely along the rear edge of the panels. As indicated, the fold 29a does not extend fully to the backwall of the outer envelope defined by the outer wall panels 25 and 26. The space left between the fold 29a and the backwall of the outer envelope defines a plenum similar to but substantially larger than the plenum defined within the stem 36 in the embodiment of FIG. 6. It will be understood that the fold 29a may be replaced by an equivalent heat sealed seam joining the inner wall panels together without departing from the scope of the invention.

Figure 4:
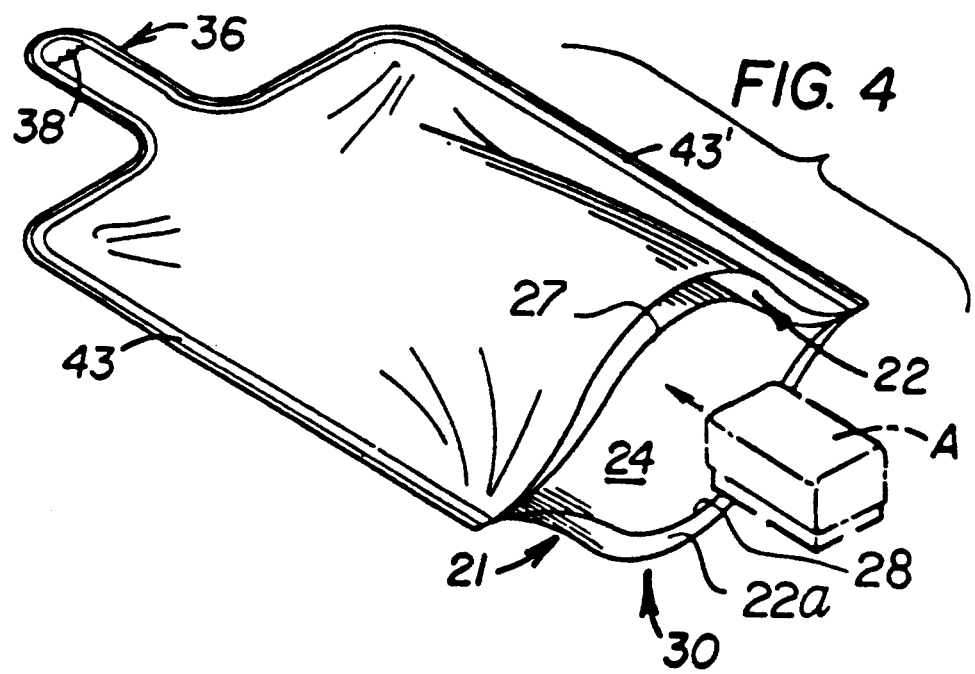
FIG. 4 is a perspective view illustrating insertion of an article into the open end of the package of FIG. 1.

When the composite package has been prefabricated to assume its open-ended envelope-like configuration as shown in FIG. 4, an article A may be inserted through the open end of inner bag 23 and into the item-receiving zone 24 formed between the inner wall panels 27 and 28. It will be apparent that regardless of the position of the article A within the zone or pocket 24, it will be firmly held in such position when the packaging system is inflated or otherwise charged or filled with the preselected filler medium, as described hereinafter.

With reference to FIG. 9, a package may be specifically designed to accommodate articles having known shapes. For example, where the article to be packaged is a wine glass, the inner panels 27 and 28 may be fastened together within the package so as to define an item-receiving zone having a selected predetermined outline especially designed to accommodate a wine glass. Thus the panels 27 and 28 may be fastened or sealed together along restriction lines 27a and 28a formed respectively in the inner panels 27 and 28 and following the general outline of a wine glass. The restriction lines may be defined by any suitable fastening technique which joins the panels 27 and 28 together such as a plurality of spot heat seals for example, or by suitable heat sealed seams which outline the shape of the article, as desired. One such heat seal 27a, 28a is shown in cross-section in FIG. 9A between the inner wall panels 27 and 28.

As defined by such restriction lines, the item-receiving zone having the outline of the particular item to be packaged retains the item or article in a relatively fixed position within the package and prevents the item from twisting, turning or otherwise moving or sliding around laterally between the inner wall panels 27 and 28 of the package during transit. The shape of the item-receiving zone or pocket as depicted by the restriction lines 27a and 28a may be varied depending upon the article to be packaged. Thus if the article is box shaped, as is article A shown in FIG. 4, a generally rectangular item-receiving pocket between the inner panels may be used. It may also be desirable to provide for a restriction line to be formed transversely across the mouth or opening to the item-receiving pocket after the item has been inserted into the pocket. For this purpose a double sided adhesive tape, generally indicated by reference numeral 27b, may be provided. The tape 27b may be adhered at one side to the interior surface of the inner wall panel 28 adjacent the mouth of the package with its other adhesive surface protected by a peel-off cover in a known way. The peel-off side of the tape faces the interior surface of the other inner wall panel 27. Once the article is emplaced within the item-receiving pocket, the peel-off cover is removed from the tape 27b and the panels 27 and 28 are fixed together to close the item-receiving pocket.

One advantage of the present invention, particularly where the restriction lines are defined by heat sealed seams, is that the pattern defined by the restriction lines may be varied during a continuous package manufacturing process without halting the production. In addition, for certain types of articles, it will be possible automatically to form the restriction lines on continuously running webs of plastic which are used to create the composite package, emplace the article automatically in the correct position between the appropriate panel layers and automatically seal and package the article therein. In this way, the packaged article may be inserted into the package during and not after production of the package, thereby leaving only the inflation step after completion of the package assembly process. It will be understood that restriction lines as described herein may be used in connection with each embodiment of the present invention. They are shown and described in connection with FIG. 9 only for purposes of illustration.

Figure 5:
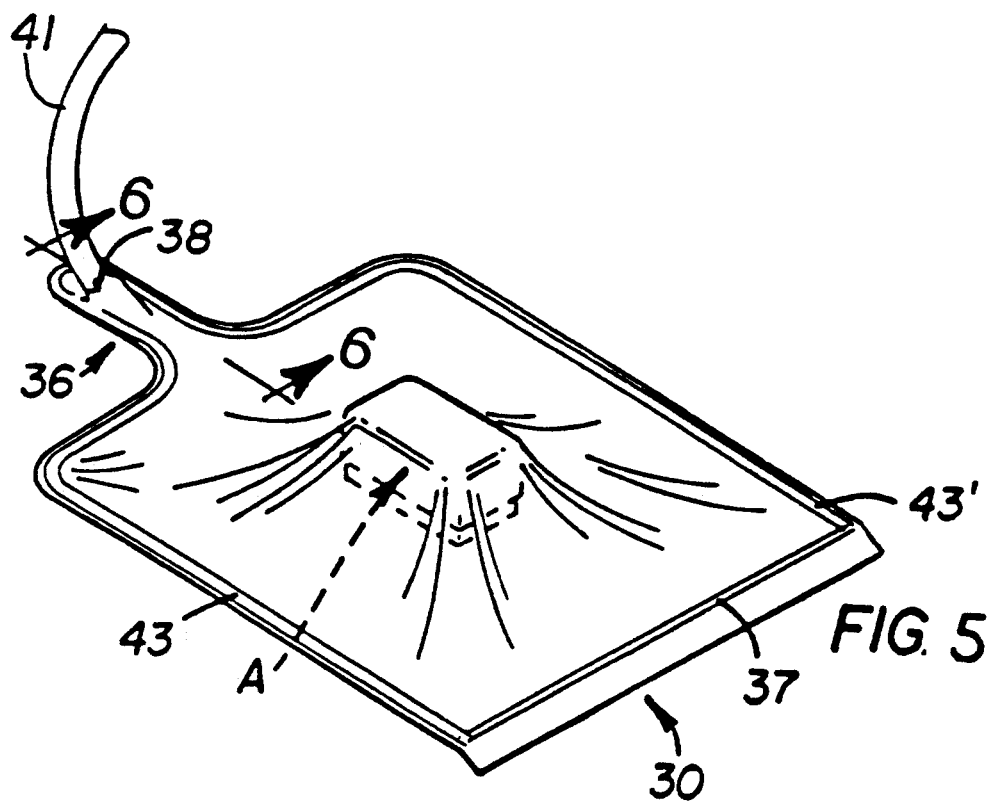
FIG. 5 is a perspective view illustrating means for inflating the inflatable chambers with a pressurized fluid.

Once the article has been placed within the item-receiving pocket 24 between the inner panels 27 and 28, overlying edge portions of formerly open end 30 may be heat-sealed together at a seam 37, as illustrated in FIGS. 1 and 5, to form a suitable end closure. The sealing apparatus used for this purpose may be of the type described in U.S. Pat. No. 4,597,244, such as the impulse table top bag sealer Model 210-8 manufactured by A.I.N. Plastics, Inc. of Mount Vernon, N.Y. Sealing thereby of the open end of the package thus fully seals the item-receiving zone or pocket 24 between the inner panels 27 and 28 as well as the front end of each of the top and bottom chambers 22 and 22a.

After the open end of the package has been sealed at seam 37, an inflation apparatus, which by way of example may include a filling tube 41 as depicted in FIGS. 5 and 6, can be utilized to charge and pressurize the chambers 22 and 22a to an inflation pressure preferably exceeding ambient pressure, e.g., exceeding 14.7 psi at sea level. Alternatively, human lung power could be utilized to inflate the chambers 22 and 22a with air. Other types of gases, such as helium, or carbon dioxide could be utilized as the filler medium, as well as a suitable liquid, such as water. Alternatively or in addition to the pressurized fluid, the chamber could be filled with a plastic (e.g., urethane, polystyrene, etc.) material in solid (injected in liquid form and solidified) or pieces (e.g., balls or pellets) form. It may also be desirable to cause the chambers to be filled as a result of a gas producing reaction between a pre-measured amount of selected reactant chemicals, for example baking soda and vinegar. The reactants may be provided within the package structure in the form of capsules (not shown) which may simply be crushed after the package is assembled, filled and sealed in order to allow the reactants to mix together and produce the inflating gas.

The composite package is charged through the filling stem 36 although the invention is not to be limited thereby. For this purpose, a cut line 38 is provided in the upper stem portion 32. Where pressurized gas or other fluid is used as the inflating medium, the filling tube 41 is inserted through the opening created by the cut line 38 and into the plenum space 39 between the stem portions 32 and 33, as shown in FIG. 6. The filler medium is thereby injected into the plenum 39 of the filler stem which is in fluid-flow communication with both of the upper and lower chambers 22 and 22a. Alternatively, the inflating means for charging the chambers 22 and 22a could comprise an inflation valve, such as the one disclosed in U.S. Pat. No. 4,586,910 and illustrated by reference numeral 40 in FIG. 8.

Figure 8:
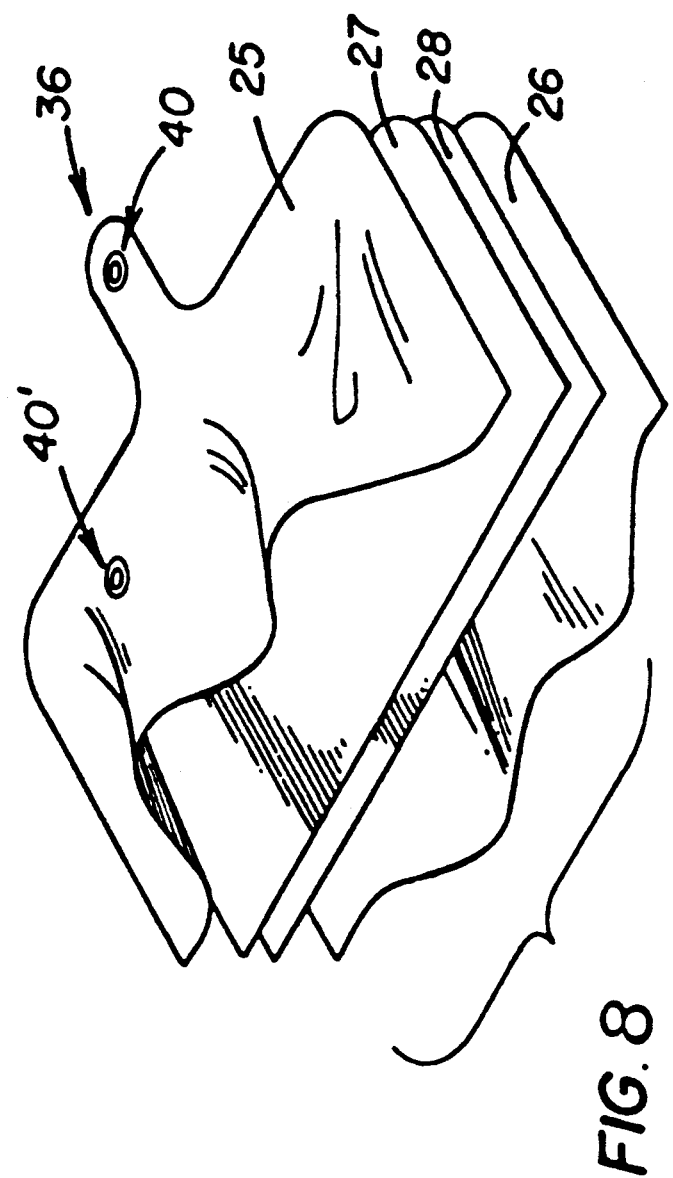
FIG. 8 is a partial perspective view of a modified packaging system.

Referring to FIG. 2, inflation of the chambers 22 and 22a causes substantial encapsulation of the article A between the inner wall panels 27 and 28 as a result of the pressure of the filler medium. In addition, the panels 27 and 28 defining the item-receiving zone are preferably secured to the outer wall panels defining the envelope along three side walls. The article is thereby supported and held at a fixed position between the chambers 22 and 22a. Compressive forces occasioned by the pressurized fluid will be directed inwardly and uniformly against the exposed surfaces of the flexible inner wall panels 27 and 28 to compress and conform them to the contours of the article. Retention of the article in a fixed position within the package is further aided by the horizontal components of forces acting on inner surface positions of transversely disposed side seams 43 and 43' of the package. Indeed, as shown in FIG. 8, suspension of the encapsulated article within the package may even be facilitated by a modified packaging system. In this alternate embodiment, the outer wall panels 25 and 26 are prefabricated to have widths greater than the widths of the inner panels 27 and 28. As a result, upon expansion of the chambers 22 and 22a under pressure, horizontal force components therein will tend to place the inner panels 27 and 28 in tension to a degree greater than where the inner and outer panels are substantially the same width.

Figure 7:
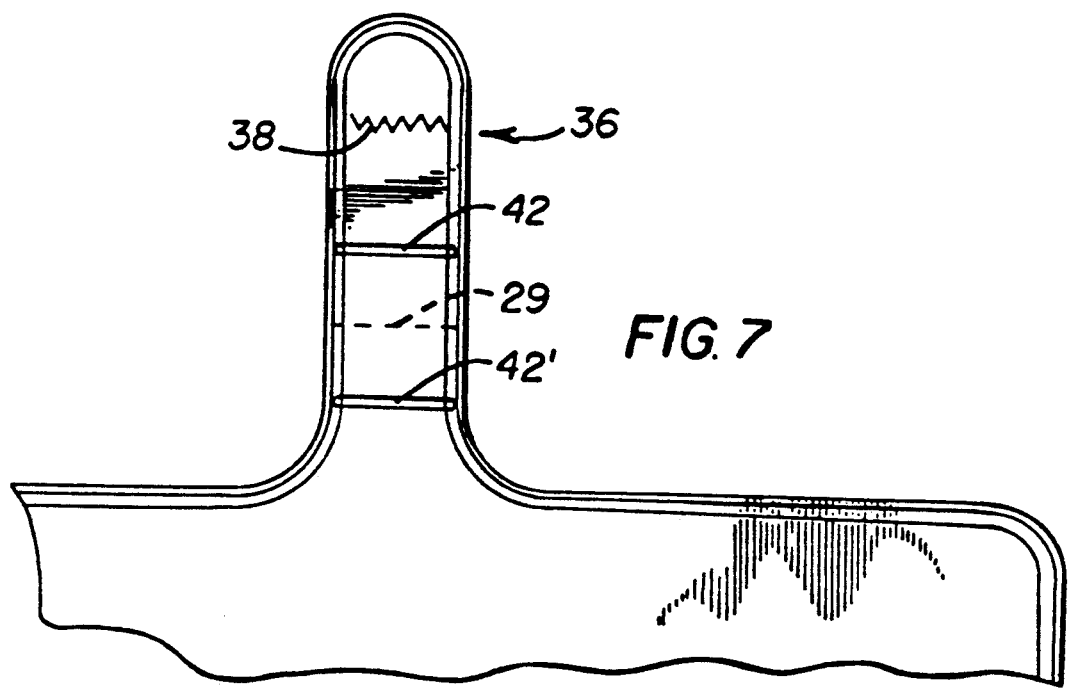
FIG. 7 is an enlarged top plan view of a filling stem for an inflatable package.

After the package has been inflated to encapsulate and suspend the article A at its preselected fixed position between chambers 22 and 22a, the fill tube 41 is removed. Pressure is then applied to the filling stem 36 to close its interior 39 to prevent the pressurized fluid from escaping. As shown in FIG. 7, the filling stem 36 may then be quickly heat-sealed at either of two locations. In one location a seam 42 seals together only the stem portions 32 and 33 of the outer wall panels 25 and 26. In another location, a seam 42' seals together the stem portions 32 and 33 and the stem portions 34 and 35 of the inner wall panels 27 and 28 respectively. The packaging is thereby complete and ready for shipment.

It should be understood that the composite package of the present invention may utilize other input techniques for the filler medium. For example, the filler stem 36 might be eliminated. Instead, a one-way check valve might be employed. One such check valve is disclosed in U.S. Pat. No. 4,674,532 to Koyanagi, although there are many such possibilities. Such a check valve might be mounted in any convenient location on one of the outer panels 25 or 26 to traverse the panel so as to communicate with one or the other of the inflatable chambers 22 and/or 22a. One such location for such a valve is depicted by the valve 40' as shown in FIG. 8. Alternatively, if it is desirable to retain the filler stem 36, a similar valve 40 might be located there, as also shown in FIG. 8.

Figure 10:
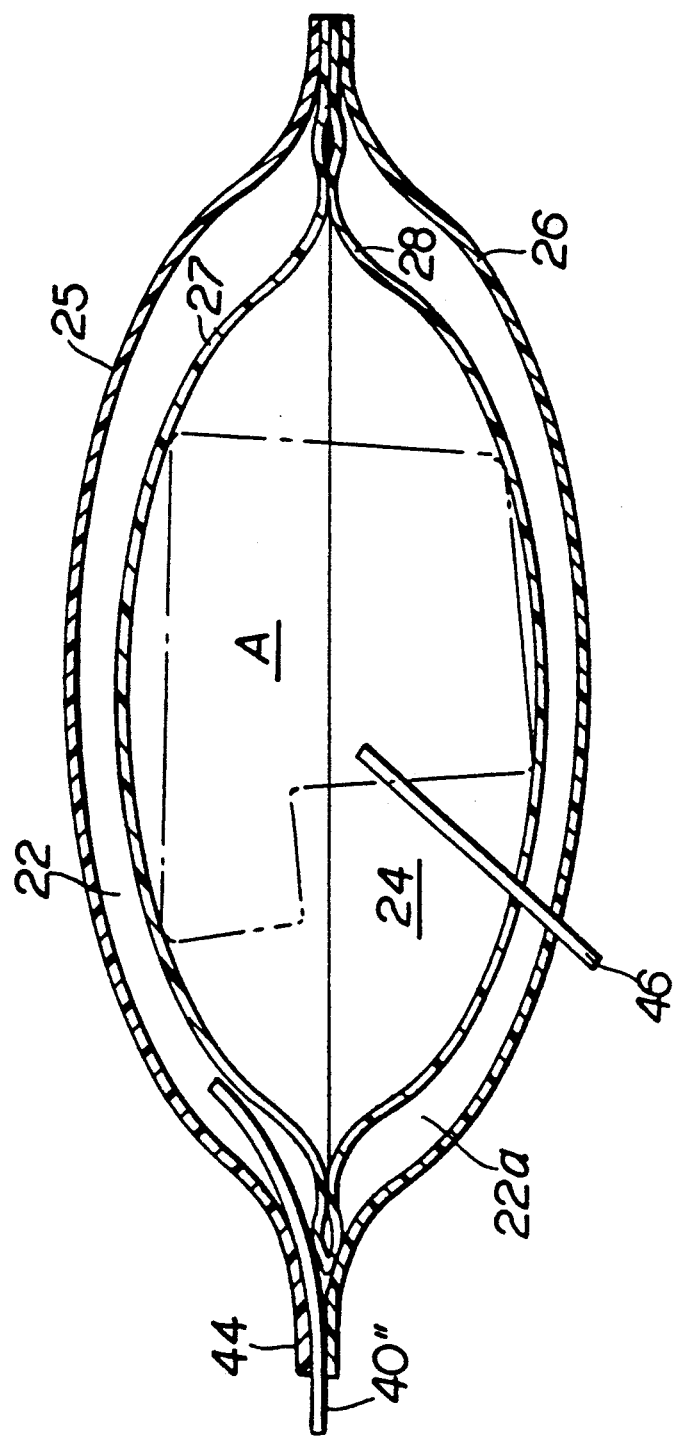
FIG. 10 is a cross-sectional view of another modification of the packaging system of FIG. 1.

Other such check valves may be used. By way of example, a check valve 40" is depicted in FIG. 9. There the valve 40" is formed into the package at the peripheral edge 43' and extends laterally inwardly through the edge of the package into one of the intercommunicating chambers 22 or 22a, as shown in broken lines in FIG. 9. Such a valve may extend between the sealed panel edges defining the edge 43' of the package or may be similarly located in any other such edge, such as the back edge 44 of the package, as shown in FIG. 10. Alternatively, the valve 40" may, as indicated above, extend through one of the outer wall panels 25 and 26, as desired.

In some instances, especially where very delicate items or items requiring a unique atmosphere to prolong shelf-life are to be packaged it may be desirable to provide a second separate check valve which communicates only with the sealed item-receiving zone or pocket 24 to control the ingress and egress of the filler medium. Thus, with reference to FIG. 10, there is shown a separate check valve 46 which extends, by way of example, through both the outer wall panel 26 and inner wall panel 28 into the interior of the item-receiving pocket 24. The use of such a valve would permit the filler medium used for inflating the expansion chambers 22 and 22a to be either the same or different from the filler medium used within the item receiving-zone or pocket 24, as desired. This alternate arrangement thereby provides increased flexibility in packaging and protecting very delicate or difficult to store items. By way of example, where the item to be packaged consists of a chemical reactor which must be protected from ambient oxygen during storage the item-receiving zone 24 may first be evacuated through the valve 46 and thereafter injected with an inert gas or some other filler medium which will not react adversely with the article. Under such circumstances, the shelf-life of the packaged item may be substantially extended. For some items to be packaged, a suitable plastic foam could be used in the item-receiving zone while ambient air is used in the surrounding expansion chambers. The valve 46 controlling access to the item-receiving zone may be placed in any desired location.

A variety of alternative end closures may be used in lieu of the heat sealed seam 37 shown in FIG. 1. For example with reference to FIG. 9, the panels 25-28 may be cut to different lengths to define relatively longitudinally staggered end edges 43" and 43'". The edge 43"" is at the distal end of a suitable fold-over flap element 43a. A standard adhesive tape and peel-off protective cover 45 may be provided on the inner surface of the extended flap 43a. The flap 43a is folded over the end of the package along a preformed crease and then mechanically sealed or heat sealed in a conventional manner to the outer surface of the wall panel 25 to close the package. It has been found preferable to provide a relatively flat adhering surface 44a which extends along the outer edge 43" of the outer wall panel 25. The adhering surface 44a remains flat even after inflation of the package chambers. The adhesive surface under the peel-off cover 45 of the flap 45a is adhesively sealed to the adhering surface 44a when the flap 43a is folded over to close the package, as described above. Since the adhering surface 44a is unaffected by inflation of the inflatable chambers of the package, the adhesive seal between the surface 44a and the flap 43a is effectively isolated from the pressure or tension generated in the wall panels upon inflation of the package chambers. The seal therefore holds more effectively.

The flat adhering surface 44a may be formed in several ways. One way is to create a relatively wide heat seal across the edge 43″ by which the inner and outer wall panels 25 and 27, for example, are sealed together. Another way is to heat seal a small seam 27c across the wall panels substantially parallel to but spaced inwardly from the seam defining the edge 43″. The end of the inflatable chamber defined between the wall panels 25 and 27 is thereby spaced inwardly from the edge 43″ by the width of the flat adhering surface 44a.

Various other opening and closing devices and constructions can be utilized and formed into the package to permit rapid and convenient opening or closing of the packaging system. These will be understood by those skilled in the art and need not be shown or explained herein in detail. For example, an elongated rod may be pressed or snap-fitted or clamped into a generally C-shaped and semi-rigid retainer thereby to firmly compress the protruding end portions of the panels of the package between them. Alternatively, one or more rip-cords or threads may be implanted in the heat-sealed end closure and adapted for removal by a consumer. As shown in FIG. 9, a notch or cut 47 may be formed in a heat-sealed side seam to permit opening of the packaging system. Where rip-cords are used, they may be suitably secured within the underside of one of the inner wall panels whereby article A will be exposed when the rip cord is removed.

Various modifications can be made to the preformed package and completed packaging system of this invention without departing from the spirit and scope thereof. For example, the inner panels 27 and 28 could comprise an open mesh or fishnet material to expose the article A to the filler medium contained in the chambers 22 and 22a. Any of the side edges of the package may constitute the open end or mouth thereof through which the article is inserted initially.

The heat-sealed seams of the system could be formed in the manner described above, or the panels folded onto each other and then heat-sealed together to form a seam having eight plies, for example. Gussetted seams could also be employed with the corners of end closure being folded inwardly towards each other and heat-sealed in place. In addition to the above described end closures, the end portions of the panels comprising the end closure could have encapsulated beads of glue formed thereon which would function to adhere and seal the panels together when pressure and/or heat is applied to the panels to rupture the beads of glue. These portions of the panels could also be multifolded over each other and then heat-sealed or reverse folded onto each other and then heat-sealed.

Figure 11:
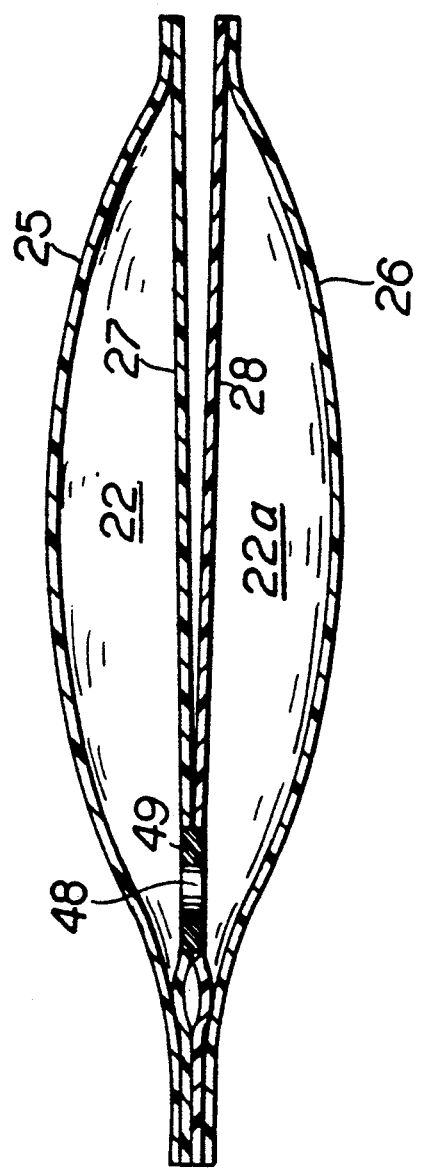
FIG. 11 is a cross-sectional view of yet another modification of the packaging system of FIG. 1.

In FIG. 11, the inner wall panels 27 and 28 and the outer wall panels 25 and 26 are peripherally sealed together so that the upper and lower chambers 22 and 22a are fully independent of one another. Where desired, fluid-flow communication between the upper and lower chambers may be achieved in this embodiment by a suitable air exchanger opening 48 formed through the inner wall panels 27 and 28. The opening 48 may be located at any suitable place on the inner wall panels, although preferably near the check valve controlling the flow of filler medium, and is sufficiently large to permit appropriate flow of the filler medium therethrough thereby to permit equalization of the medium pressure within the chambers 22 and 22a. Panels 27 and 28 may be heat sealed together as depicted at seal area 49 in FIG. 11. The sealed area 49 may preferably be about the size of a silver dollar. The hole 48 is formed directly through the sealed area 49 so as to constitute a through-hole between the two chambers 22 and 22a, thereby placing these chambers in fluid-flow communication, as described above. It will be understood that the structures are not limited by the location, nature or configuration of the through-hole 48 or the sealed area 49 through which it is formed. For example, instead of the opening 48, communication between the inflatable chambers 22 and 22a may be achieved with a check valve which traverses the inner wall panels 27 and 28. Such a check valve might be a one-way valve which, by way of example, permits fluid under pressure to flow from the chamber 22 through the valve and into the chamber 22a but not in the other direction. Such a valve would provide some protection for the articles in the event the chamber 22 were to lose pressure in transit. In such an embodiment, the input valve (not shown in FIG. 11) would extend into the chamber 22.

In FIGS. 12 and 13, the packaging system consists of an elongated inflatable element 51 which is divided into a plurality of differentiated and preferably communicating inflatable chambers 52, 53 and 54. The chambers 52 and 54 are preferably of substantially equal volume and may be formed as a result of traverse seams 56 and 56′ which extend at least part way across the inflatable element 51 at predetermined locations. Two such seams are placed adjacent the transverse center line of the inflatable element 51 so as to define the middle relatively smaller chamber 53 between the chambers 52 and 54. The structures are not limited to a package having precisely the three inflatable chambers 52–54 as described herein. Multiple chambers of any appropriate number and size may be formed in this embodiment without departing from the scope of the invention.

With reference to FIG. 13, the inflatable element 51 may consist of a pair of superimposed, generally rectangular and substantially coextensive wall panels 57 and 58. The wall panels 57 and 58 are preferably preformed sheets of suitable plastic material, as described above, and are heat-sealed together at the longitudinally spaced and substantially parallel transverse seams 56 and 56′ and along longitudinally spaced and substantially parallel side seams 59 and 61 and end seams 63, 64 thereof. As shown in FIG. 12, each of the seams 56 and 56′ terminates short of the side edge sealed portions 59 and 61. This arrangement thus provides passages between the ends of the seams 56 and 56′ and adjacent side edge seams of the inflatable element thereby permitting fluid-flow communication between the chambers 52, 53 and 54 when the inflatable element is injected with the filler medium.

It should be understood that one or more of such transverse seams could be utilized intermediate the ends of the inflatable element, as illustrated by the broken line 62 in FIG. 12, to provide various hinge-like functions at the rearward side of the composite packaging system, as described below. Alternatively, a single sheet of suitable packaging material can be folded laterally over itself and heat sealed along a single side seam together with the end seams. Also, the package can be formed from a seamless tube of material which is heat-sealed at the ends only to form the end seams 63 and 64.

The sheet material composing the package may comprise a gas-impervious composite laminate as described above. Further, the panels may be suitably cut and sealed together by conventional apparatus and methods, such as those described in U.S. Pat. No. 4,545,844.

With reference to FIG. 14, the composite package is formed by folding the inflatable element at the hinged section defined in the embodiment by the heat seams 56 and 56' and the small inflatable chamber 53 therebetween. When folded in this way, the chamber 52 overlies the chamber 54, as illustrated in FIG. 15. Overlying side edge seams 59 and 61 are then heat-sealed together (or mechanically secured together by a standard adhesive, stitching, and the like) to form package side seams 66 and 67, respectively. When deflated, the folded package is thus adapted to have the article A inserted through the open frontal side of the packaging system and into an internal item-receiving zone or pocket 68 which is defined by the overlying interior panels 69 and 71 of the chambers 52 and 54 respectively.

After the article has been inserted, a standard inflation apparatus, including for example a fill tube 72 as shown in FIG. 14, can be utilized to charge and pressurize the intercommunicating chambers 52, 53 and 54 to an inflation pressure exceeding ambient pressure, e.g., exceeding 14.7 psi at sea level. Alternatively, human lung power could be utilized to inflate the chambers with air.

Other types of gases, such as helium or carbon dioxide, could be utilized as a filler medium, as well as a suitable liquid, such as water. As mentioned above, the expansion chambers could be filled with a plastic material (e.g., urethane, polystyrene, etc.) material in solid (injected in liquid form and solidified) or pieces (e.g., balls or pellets) form.

Should it prove desirable to fill the chambers with a solid filler medium of the type described above, such filler medium may be pre-packed into the chambers prior to forming one or more of edge seams or to provide a separate inflating means or valve for communicating the filler medium to each chamber individually. In such an application, the seams 56 and 56' could be extended the full width of the inflatable element 51 to place the chambers out of fluid-flow communication in respect to each other.

Upon inflation of the chambers 52, 53 and 54, the article A is compressed between the overlying chambers 52 and 54 to retain it in a fixed position within the packaging system. The third chamber 53 is pivotally mounted between the first and second chambers 52 and 54 at the heat-sealed seams 56 and 56' thus to provide hinge means interconnecting the different sections of the composite package together at a rearward side of the packaging system as described above. The opposite lateral sides of the packaging system are closed by heat sealing the overlying side edges of the inflatable element to form the side seams 66 and 67. End edge portions 63 and 64 remain unattached to each other at the frontal side of the packaging system to expose the item-receiving zone or pocket 68. Suitable inflating means, such as the valve 73 as disclosed in U.S. Pat. No. 4,586,910, may be used selectively to communicate a filler medium to intercommunicating chambers 52 and 54. Such a hinge permits the juxtaposed chambers 52 and 54 in the composite package to lie relatively parallel to one another after inflation thereof. This reduces stress in the side seams of the completed package. In addition, the chamber 53, upon inflation, suitably protects the rear end of the package.

Figure 14A:
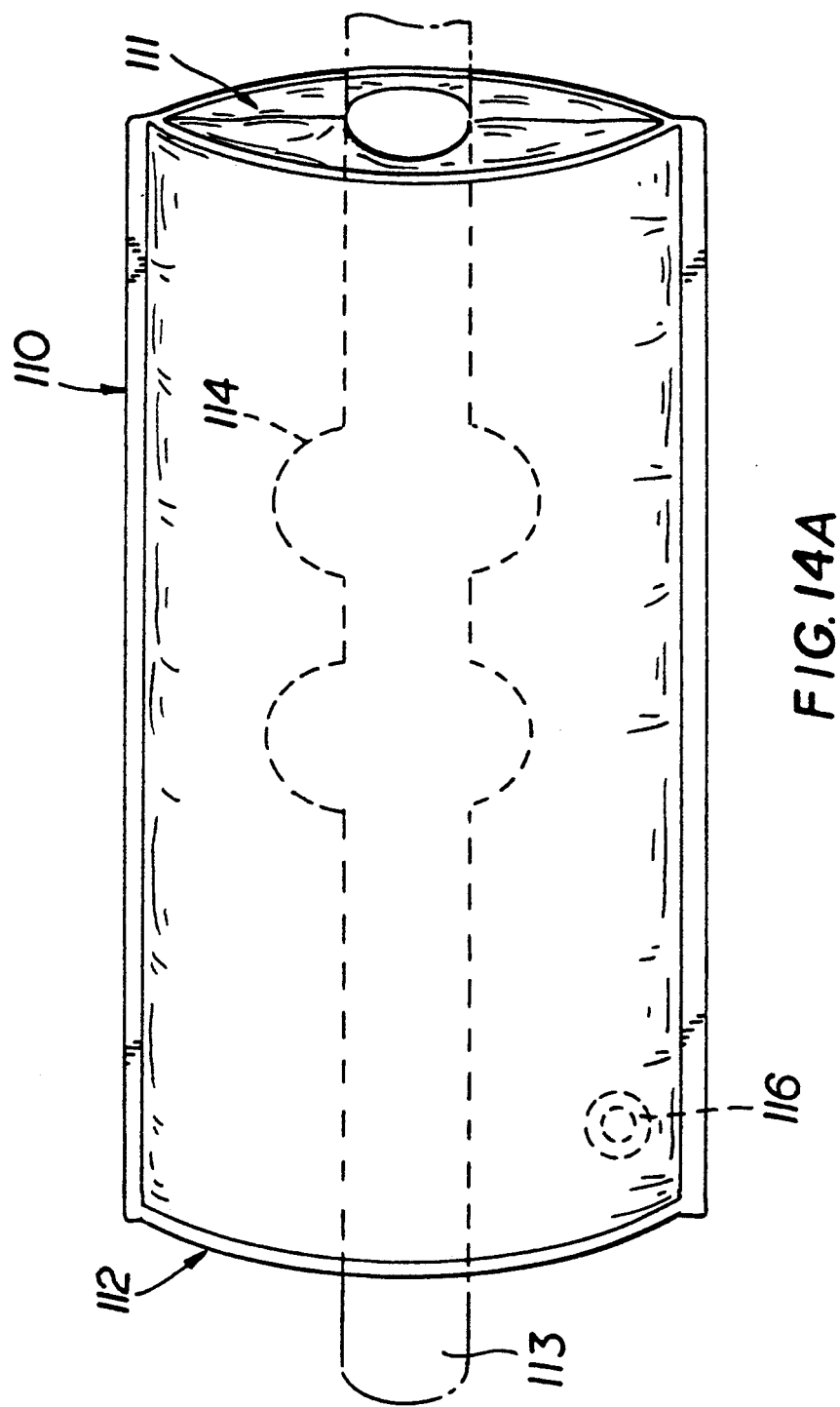
FIG. 14A is a perspective view of a modification of the packaging system depicted in FIG. 14.
Figure 15:
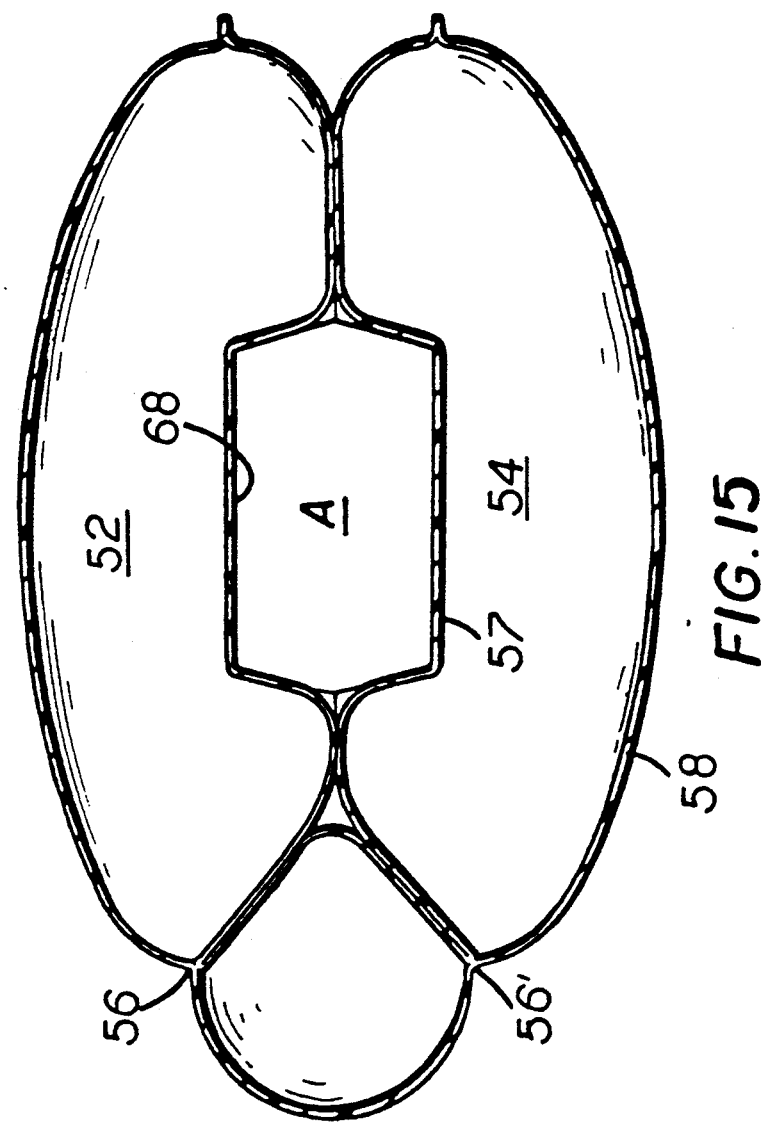
FIG. 15 is a longitudinal sectional view taken along the line XV—XV of FIG. 14.

The structure shown in FIG. 14A is able to surround and protect delicate portions of an otherwise elongated article too large for the standard inflatable packages described hereinabove. An inflatable package 110 has two open ends 111 and 112. The open ends may be formed simply by leaving unsealed the "side" seams 66 and 67 of FIG. 14 and by sealing the "front" seams 63 and 64. Thus, an object 113 having an odd shape, including delicate portions 114 which must be protected, may be inserted into the package, when deflated, so that the delicate portions 114 are between the inflatable chambers. Inflation of the chambers yields a substantial encapsulation of the article portions 114, as described above. Where, as indicated above, the hinge system is eliminated, fluid flow communication between the inflatable chambers of the package may be accomplished by use of an air exchange through-hole 116 of the type described above in connection with the embodiment of FIG. 11.

FIGS. 16 and 17 show modified structures which may be utilized either in the structure of FIGS. 1–11 or in the structure of FIGS. 12–15. In either case, the outer wall panels of the package may be fastened to the adjacent inner wall panels at a plurality of selected locations other than the peripheral edges. By way of example only, one of the outer panels 81 may be fastened to the adjacent inner panel 82 at a plurality of points 83 so that the overall effect resembles a tufted or quilted exterior surface. The fastening points may be created in any suitable way such as by spot heat-sealing or stitching and the like. Heat-sealing is preferred for its efficiency in connection with automated manufacturing techniques but the invention is not to be limited to the use of heat seals.

The same or a different pattern of fastening locations may be used with respect to the other outer panel 84 and its adjacent inner panel 86. Such an arrangement serves to reduce the overall bulk of the composite inflated package and also improves the aesthetic appearance of the package. Any suitable pattern or design may be used, as desired, it is preferred however that the number and effect of such fastening locations be suitably limited to reduce the bulk of the package without otherwise interfering with the fluid flow communication permitting inflation of the upper and lower chambers 22 and 22a.

Referring now to FIGS. 18 and 19, a packaging system may be provided such that the overlying expansion chambers are defined, for example, by an upper plurality of independently inflatable chambers 86–89 in one rank and a lower plurality of independently inflatable chambers 91–94 in another rank. In the composite package, the upper and lower ranks of chambers are superimposed so as to encapsulate the article therebetween. Independence of the chambers may be achieved in a variety of ways. In one example the independent chambers are defined by a plurality of heat sealed seams 96 formed between the outer wall panel and its adjacent inner wall panel and which thereby divide the upper chamber 22, for example, into the aforementioned plurality of separate chambers 86–89. Each such chamber is separated from the adjacent chamber by one of the seams 96. The seams may be formed in any desired configuration to satisfy aesthetic requirements. Heat sealing techniques may be utilized to form the seams 96 during automated manufacture of the package from a plurality of continuously running webs of heat sealable plastic.

The aesthetic and practical effects of this variation are similar to those of the tufted or quilted look described in connection with FIGS. 16 and 17. Here however each of the chambers is designed to be independent of the adjacent chambers. In this embodiment, a puncture of any one or more of the chambers 86–89 or 91–94 will not have any effect on the other remaining chambers.

Each of the chambers 86–89 and 91–94 is provided with an independent separately sealable input or filler channel 86a–89a respectively, also preferably defined by and between the seams 96. For expediency, each of the channels may extend into a single plenum cavity or volume 97 formed as part of a filling stem structure 98 which may be similar to the filling stem 36 depicted in the embodiment of FIGS. 1-7. Filler medium injected under pressure into the plenum cavity 97 will exit therefrom and flow through each filler channel with which the plenum is in fluid-flow communication. When the chambers 86–89 are filled thereby, a single seal 99 may be formed across the filler stem 98 to close and seal the mouths of the filler channels thereby to retain the chambers in their inflated condition.

The composite package may be formed in such a way that each chamber in one rank is aligned with a corresponding chamber of the adjacent rank, as shown in FIG. 19. Under some circumstances, however, it may be desirable for the chambers of one rank to overlie the seams of the other rank.

Figure 20:
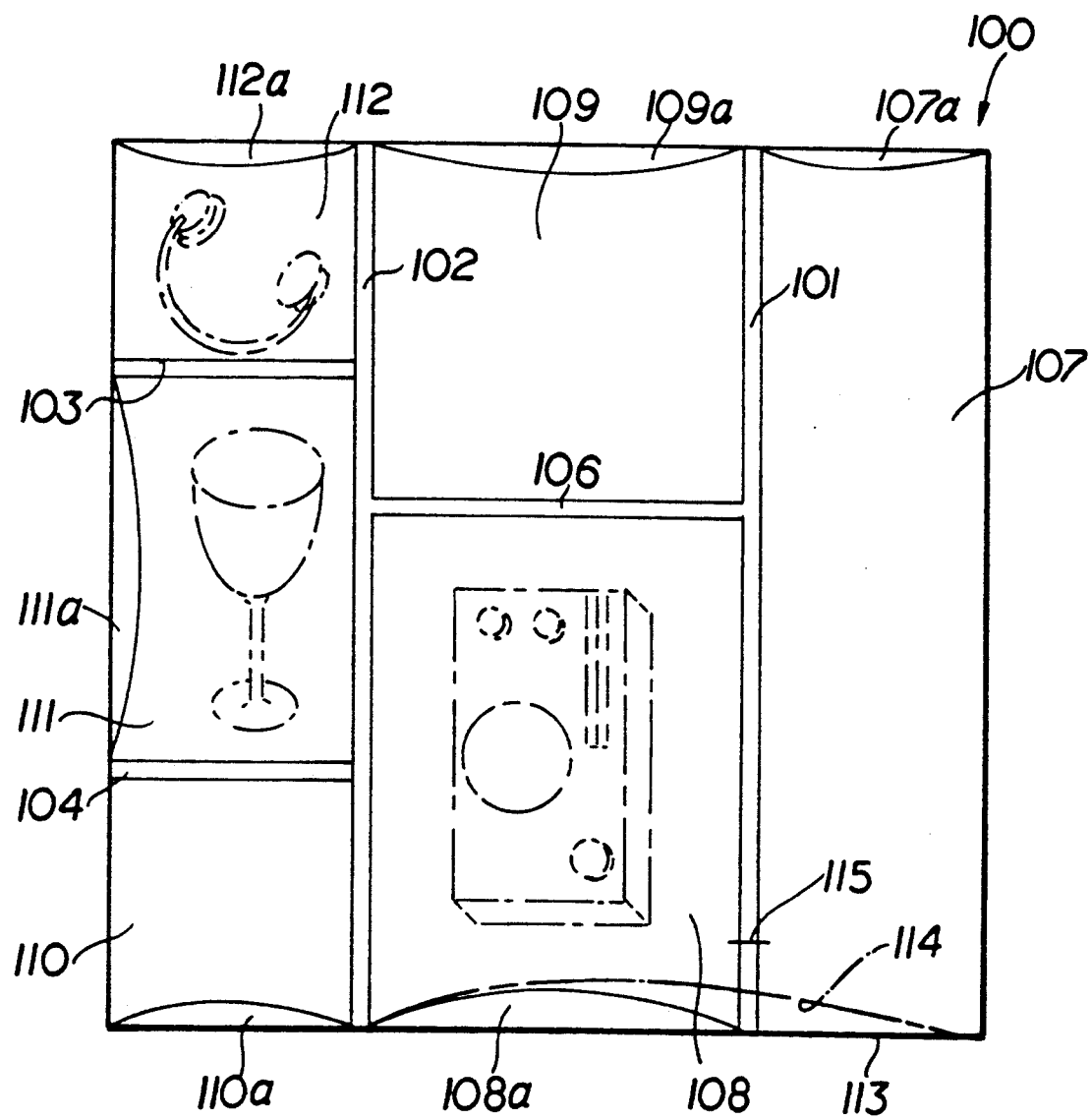
FIG. 20 is a top plan view of yet another structure, having multiple item-receiving zones.

With reference to FIG. 20, there is shown yet another modification in which a plurality of item-receiving zones or pockets is formed within a single package system. For example a single package system 100 may be constructed in accordance with any of the foregoing modifications and is provided with a predetermined grid of heat sealed seams, for example, seams 101, 102, 103, 104 and 106. The seams 101–106 define a plurality, in this case six, item-receiving zones 107–112 between them which may be of different sizes, as shown, in order to accommodate different items within the package. For example, zone 108 is shown to carry a small radio whereas zone 112 is shown to carry headphones. The number, size and shape of the item-receiving zones may vary according to the types of items intended to be packaged. Each zone has a sealable opening 107a–112a the location of which may also vary according to the anticipated packaging needs. The inflatable chambers protecting the items may be independently inflatable or may be constructed so as to be in fluid flow communication with each other in accordance with the techniques described above pertaining to other embodiments of the present invention. A major advantage of the present invention is the flexibility provided in constructing the package system to meet different packaging needs. For example, the heat seam 101 need not extend completely across the package, as shown, but might terminate short of the package edge 113 for example at the point indicated by reference numeral 115. In that event the zones 107 and 108 would be interconnecting and, if provided with a common opening 114 (shown in a broken line by way of example), could accommodate an item such as a telephone in which the body of the phone is packaged in zone 108 while the handset is situated within the adjacent zone 107. The cord connecting the body of the phone and its handset will run past the point 115 from one zone to the other. It should be noted that the number, size, shape and opening locations for the various item-receiving zones may be varied from one package to the other without departing from the scope of the present invention.

Referring again to FIG. 9 it may be desirable for any of the foregoing package modifications to be provided with a handle element to assist in the transport of the package. In some cases the handle element may be a conventional grip 101 which is fastened to the package, for example, along one peripheral edge and which is provided with a standard finger slot 102. Where desirable, the handle may be constructed so as to be detachable at will from the package. This may be accomplished by joining the handle to the package along a conventional perforated tear-off line 103. The handle or grip 101 may be made of the same plastic material as the rest of the package, or of a different material.

Other forms and types of handle grips may also be used. Another such grip 104 is depicted in broken lines in FIG. 9. The grip 104 may be releasably connected to the body of the package at its ends, as shown.

The Improvement Made By The Present Invention

Figure 21:
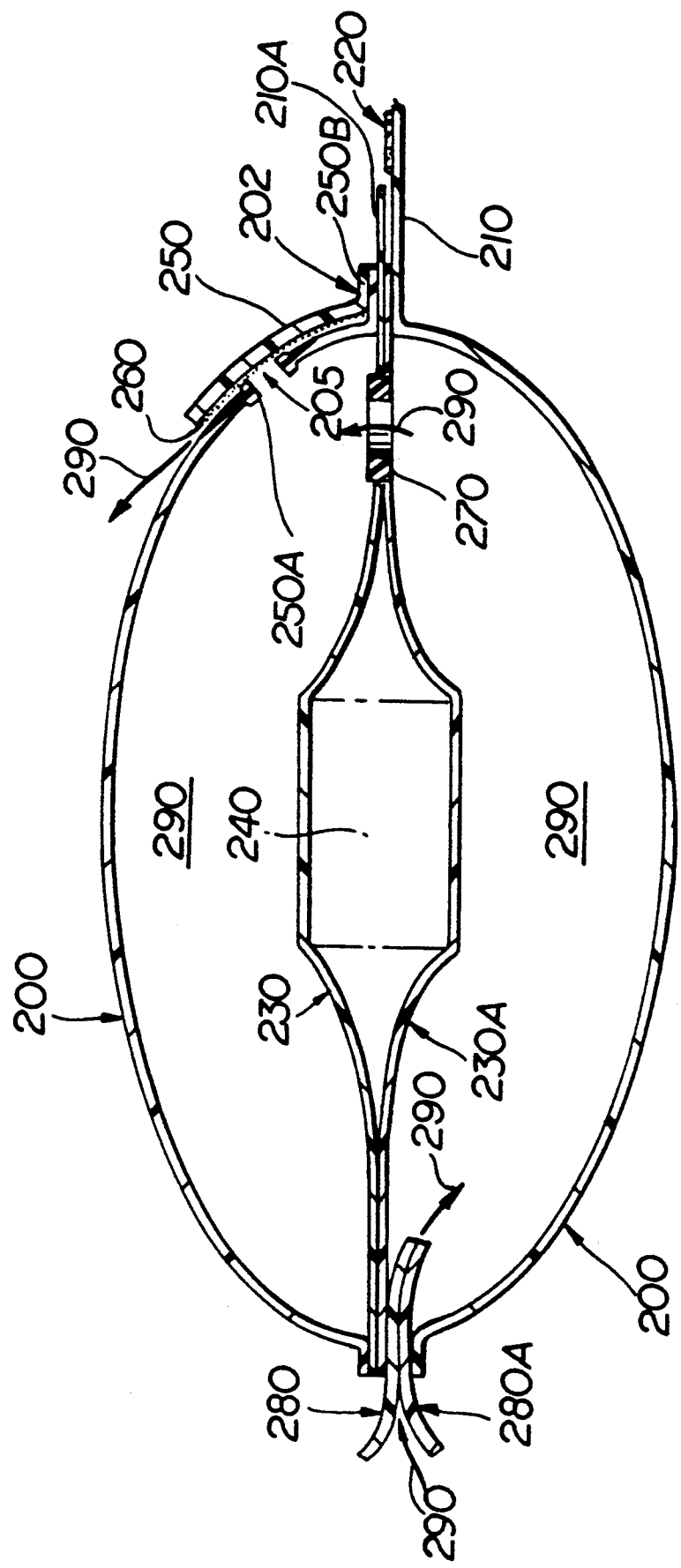
FIG. 21 is a sectional view of a first preferred embodiment of a flexible, inflatable packaging device constructed in accordance with the present invention, the device being shown inflated and enclosing an article for shipment.
Figure 21A:
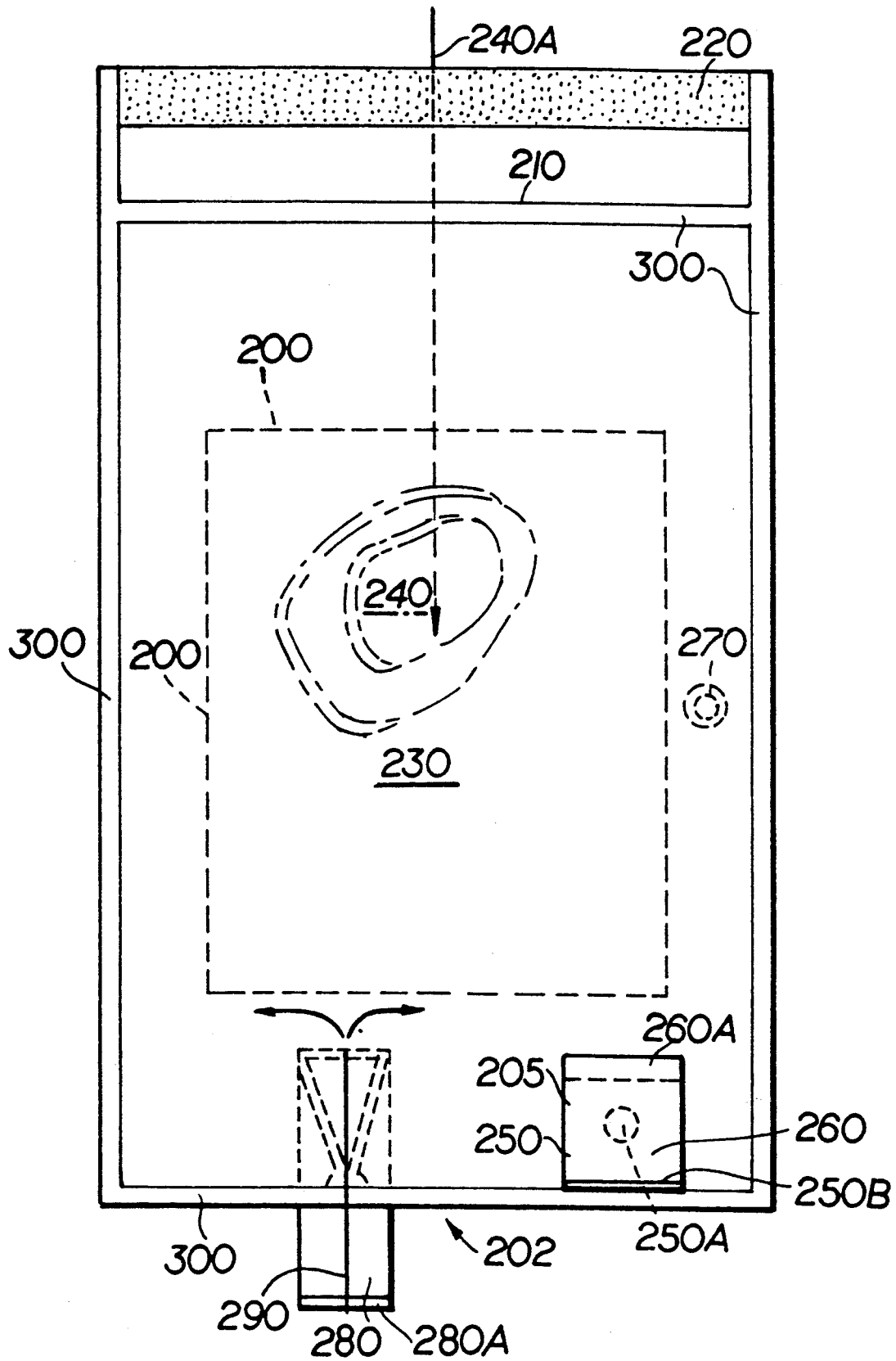
FIG. 21A is a plan view of the device, partly broken away.

FIGS. 21 and 21A show a flexible, inflatable, 4-ply packaging device having outer bag walls 200 constructed in accordance with the present invention. While a specific design is disclosed, it can have any of the designs disclosed above. The packaging device of the invention is adapted to enclose and protect an article 240 during shipping and the like. The packaging device comprises user-controllable means 202 for selectively admitting an inflation medium, preferably air or a selected gas, to inflate the packaging device to protect an enclosed article such as 240 against rough handling during shipping and the like and releasing the inflation medium to deflate the packaging device to enable removal of the article 240 from the packaging device and compact storage of the packaging device before and after shipping. The user-controllable means 202 is operable a plurality of times in accordance with the invention, thereby enabling reuse of the packaging device for shipping a plurality of articles in succession.

The user-controllable means 202 comprises an inflation valve (including air ingress valve 280 for the upper ply and 280A for the lower ply) in the packaging device for admitting the inflation medium, means 205 defining an aperture 250A in the packaging device for releasing the inflation medium, and means for selectively enabling and disabling the flow of the inflation medium through the aperture 250A.

The means for selectively enabling and disabling comprises tape means or an outer-bag air-release tab 250 and reusable adhesive means 260 on the inner wall of the release tab 250 (though it could be on the outer wall of the bag). The tab 250, the reusable adhesive 260, and the means 205 defining the aperture 250A cooperate to enable the tab 250 to be selectively placed over the aperture 250A to disable flow of the inflation medium through the aperture 250A or removed from the aperture 250A to enable the flow of the inflation medium through the aperture 250A.

The tab 250 is formed with an extension 260A that avoids cooperation with the adhesive 260, thereby remaining free of the means 205 defining the aperture 250A and facilitating grasping of the extension 260A by a user of the packaging device to peel the tab 250 away from the means 205 defining the aperture 250A.

A hinge 250B is connected to the tab 250, and means such as a heat seal is provided permanently attaching the hinge 250B to the means 205 defining the aperture 250A.

The hinge 250B is elongate and resists lateral displacement of the tab 250 and facilitates proper alignment of the tab 250 with the aperture 250A when the tab 250 is placed over the aperture 250A.

Figure 22:
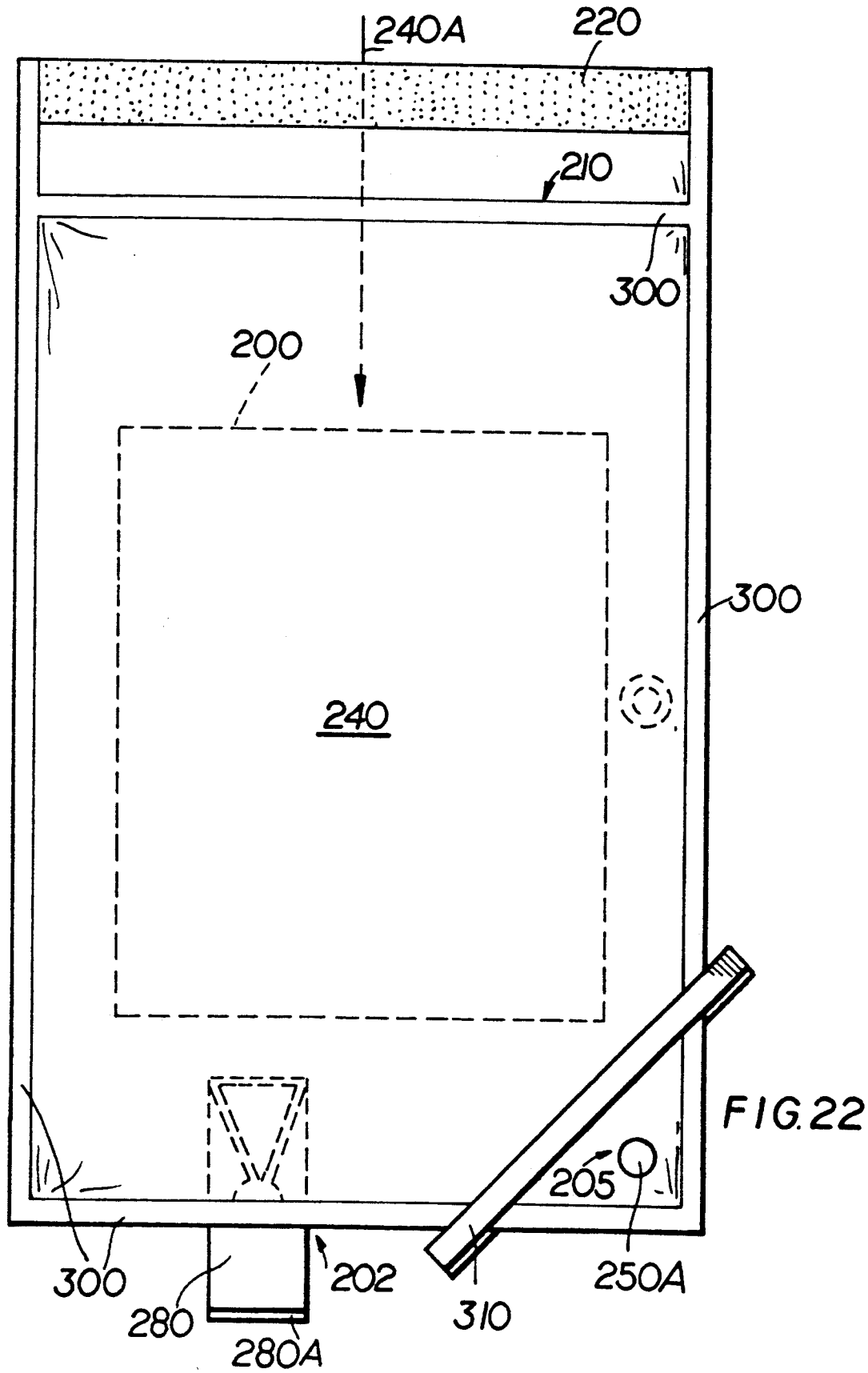
FIG. 22 is a view corresponding to FIG. 21A but showing another preferred embodiment of a flexible, inflatable packaging device constructed in accordance with the present invention.

In the embodiment of FIG. 22, the means for selectively enabling and disabling comprises a clip 310 engageable with the means 205 defining the aperture 250A and mechanically squeezing the means 205 defining the aperture 250A to disable flow of the inflation medium through the aperture 250A. The clip 310 is selectively removable from the means 205 defining the aperture 250A to enable the flow of the inflation medium through the aperture 250A.

The clip 310 is preferably made of metal or a molded plastic and is in the form of a spring clip for selectively confining or releasing air from the outer bag chamber, thereby enabling reuse of the bag (packaging device).

The details of FIGS. 21, 21A and 22 are summarized as follows:

FIG. 21:

| | |
|---|---|
| 200 | Outer bag walls of a 4-ply inflatable bag |
| 210 | Open end of inner bag |
| 210A | Opposite open end of inner bag |
| 220 | Reusable adhesive tape for closure and reopening |
| 230 | Inner chamber for receiving product |
| 240 | Product |
| 240A | Direction of product loading |
| 250 | Outer bag air release tab |
| 250A | Heat-sealed air release hole in outer bag wall |
| 250B | Hinge sealing release tab to perimeter of dual chamber bag (heat seal) |
| 260 | Strip of reusable adhesive on inner wall of release tab |
| 260A | Free extension of 250 |
| 270 | Heat-sealed hole defining air transfer from outer to inner chamber |
| 280 | Air ingress valve, upper ply |
| 280A | Air ingress valve, lower ply |
| 290 | Air ingress direction to fill outer bag chamber and shrink inner bag chamber around product |

FIG. 21A:

| | |
|---|---|
| 200 | Outer bag wall |
| 210 | Open end of inner bag |
| 210A | Opposite open end of inner bag |
| 220 | Reusable adhesive tape for closure and reopening |
| 230A | First wall of inner bag |
| 240 | Product |
| 240A | Direction of product loading |
| 250 | Outer bag air release tab |
| 250A | Heat-sealed air release hole in outer bag wall |
| 260 | Strip of reusable adhesive on inner wall of release tab |
| 270 | Heat-sealed hole defining air transfer from outer to inner chamber |
| 280 | Air ingress valve, upper ply |
| 280A | Air ingress valve, lower ply |
| 290 | Air ingress direction to fill outer bag chamber and lock inner bag chamber around product |
| 300 | Perimeter heat seals combining 4-ply bag structure, filling valve and outer bag release tab |

FIG. 22:

| | |
|---|---|
| 200 | Outer ply of 4-ply bag construction |
| 210 | Open end of inner bag |
| 220 | Reusable adhesive tape for closure and reopening bag |
| 240 | Product locked in center chamber of inflated bag |
| 240A | Product loading direction |
| 250A | Heat-sealed, exposed hole in outer wall of one ply of the outer bag |
| 280–280A | Air ingress valve walls |
| 300 | Perimeter heat seals |
| 310 | Metal or molded plastic spring clip for confining and releasing air from outer bag chamber, enabling reuse of bag. |

Thus there is provided in accordance with the invention a novel and highly effective inflatable packaging device that is adapted to enclose and protect an article during shipping and the like and that accomplishes the objects of the invention as set out above. A method of employing the device to full advantage is also provided. Many modifications of the preferred embodiments of the invention disclosed herein will readily occur to those skilled in the art. Accordingly, the invention is intended to include all structure that falls within the scope of the appended claims.

We claim:

1. A flexible, inflatable packaging device that is adapted to enclose and protect an article, said packaging device comprising:
    user-controllable means for selectively admitting an inflation medium to inflate said packaging device to protect an enclosed article against rough handling and release means separate from and in spaced-apart relation to said user-controllable means for releasing said inflation medium to deflate said packaging device to enable removal of the article from said packaging device and compact storage of said packaging device before and after shipping, said user-controllable means and said release means being operable a plurality of times, thereby enabling reuse of said packaging device for shipping a plurality of articles in succession.

2. A packaging device according to claim 1 wherein said user-controllable means comprises an inflation valve in said packaging device for admitting said inflation medium and said release means defines an aperture in said packaging device for releasing said inflation medium and includes means for selectively enabling and disabling flow of said inflation medium through said aperture.

3. A packaging device according to claim 2 wherein said means for selectively enabling and disabling comprises tape means and reusable adhesive means, said tape means, said reusable adhesive means, and said means defining said aperture cooperating to enable said tape means to be selectively placed over said aperture to disable flow of said inflation medium through said aperture or removed from said aperture to enable said flow of said inflation medium through said aperture.

4. A packaging device according to claim 3 further comprising an extension of said tape means that avoids cooperation with said adhesive means, thereby remaining free of said means defining said aperture and facilitating grasping of said extension by a user of said packaging device to peel said tape means away from said means defining said aperture.

5. A packaging device according to claim 3 further comprising hinge means connected to said tape means and means permanently attaching said hinge means to said means defining said aperture.

6. A packaging device according to claim 5 wherein said hinge means is elongate and facilitates proper alignment of said tape means with said aperture when said tape means is placed over said aperture.

7. A packaging device according to claim 5 wherein said hinge means comprises a heat seal sealing said hinge means to said means defining said aperture.

8. A packaging system according to claim wherein said inflation medium is air.

9. A packaging system according to claim 1 wherein said inflation medium is a selected gas.

10. A packaging system according to claim 2 wherein said means for selectively enabling and disabling comprises clip means engageable with said means defining said aperture and mechanically squeezing said means defining said aperture to disable said flow of said inflation medium through said aperture, said clip means being selectively removable from said means defining said aperture to enable said flow of said inflation medium through said aperture.

11. A shipping method comprising the steps of:
providing an inflatable packaging device;
admitting an inflation medium at a first part of said packaging device to inflate said packaging device to protect an article enclosed therein against rough handling;
shipping said packaging device with said enclosed article;
releasing said inflation medium at a second part of said packaging device in spaced-apart relation to said first part of said packaging device to deflate said packaging device;
removing said article from said packaging device;
enclosing another article in said packaging device for shipping;
inflating said packaging device by admitting an inflation medium at said first part to protect said other enclosed article against rough handling;
shipping said other enclosed article;
deflating said packaging device by releasing said inflation medium at said second part; and
removing said other enclosed article.

* * * * *

UNITED STATES PATENT AND TRADEMARK OFFICE
CERTIFICATE OF CORRECTION

PATENT NO. : 5,272,856
DATED      : December 28, 1993
INVENTOR(S): Daniel A. Pharo It is certified that error appears in the above-indentified patent and that said Letters Patent is hereby corrected as shown below:

Col. 3, line 45, change "Jul.7" to --Jul. 27--

Col. 17, line 4, after "claim" insert --1--

Signed and Sealed this

Eleventh Day of October, 1994

Attest:

BRUCE LEHMAN

*Attesting Officer*    *Commissioner of Patents and Trademarks*